(12) United States Patent
Lamontagne et al.

(10) Patent No.: US 9,244,245 B2
(45) Date of Patent: Jan. 26, 2016

(54) AUTO-CENTERING OF AN OPTICAL ELEMENT WITHIN A BARREL

(71) Applicant: INSTITUT NATIONAL D'OPTIQUE, Québec (CA)

(72) Inventors: Frédéric Lamontagne, Québec (CA); Nichola Desnoyers, Québec (CA)

(73) Assignee: INSTITUT NATIONAL D'OPTIQUE, Quebec, Quebec (CA)

( * ) Notice: Subject to any disclaimer, the term of this patent is extended or adjusted under 35 U.S.C. 154(b) by 29 days.

(21) Appl. No.: 14/329,609

(22) Filed: Jul. 11, 2014

(65) Prior Publication Data

US 2015/0131175 A1 May 14, 2015

Related U.S. Application Data

(60) Provisional application No. 61/901,846, filed on Nov. 8, 2013.

(51) Int. Cl.
*G02B 7/02* (2006.01)
*G02B 7/00* (2006.01)
*G02B 7/18* (2006.01)

(52) U.S. Cl.
CPC .................. *G02B 7/003* (2013.01); *G02B 7/02* (2013.01); *G02B 7/022* (2013.01); *G02B 7/026* (2013.01); *G02B 7/021* (2013.01); *G02B 7/18* (2013.01); *Y10T 29/49826* (2015.01)

(58) Field of Classification Search
CPC .......... G02B 7/003; G02B 7/02; G02B 7/021; G02B 7/022; G02B 7/023; G02B 7/04; G02B 7/18
USPC .................. 359/811, 813, 819, 820, 694–701
See application file for complete search history.

(56) References Cited

U.S. PATENT DOCUMENTS 3,142,239 A 7/1964 Meixner
3,560,080 A * 2/1971 Wilczynski et al. ... G02B 7/023
359/813

(Continued)

FOREIGN PATENT DOCUMENTS

CN 203164577 U 8/2013
DE 199 43 452 A1 3/2000
JP 2012-173366 A 9/2012

OTHER PUBLICATIONS

Lee et al., "Creative Optomechanical Tolerancing in Lens Systems", Proc. of the SPIE vol. 3482, pp. 187-200, (1998).

(Continued)

*Primary Examiner* — Loha Ben
(74) *Attorney, Agent, or Firm* — Merchant & Gould P.C.

(57) ABSTRACT

Auto-centering is for an optical element mounted in a cavity of the barrel. A first surface of the optical element engages a seat provided in the cavity. A retaining ring is threaded on the barrel, through complementary barrel and ring threads. The retaining ring engages a peripheral region of a second surface of the optical element, thereby securing the optical element between the seat and the retaining ring. The profile of the barrel threads and the spatial profile of the peripheral region of the second surface are selected in view of an auto-centering condition whereby any decentering of the retaining ring and a corresponding tilt of the retaining ring have counterbalancing effects on the centering of the optical element. Optical assemblies and a mounting method are used with the optical element.

46 Claims, 39 Drawing Sheets

(56) References Cited

U.S. PATENT DOCUMENTS

| | | | |
|---|---|---|---|
| 3,888,568 | A | 6/1975 | Norris et al. |
| 4,733,945 | A | 3/1988 | Bacich |
| 4,778,252 | A | 10/1988 | Filho |
| 4,854,671 | A | 8/1989 | Hanke et al. |
| 5,177,641 | A | 1/1993 | Kobayashi et al. |
| 5,510,935 | A | 4/1996 | Whitty et al. |
| 6,292,311 | B1 | 9/2001 | Bohn et al. |
| 6,381,081 | B1 | 4/2002 | Ford |
| 7,227,236 | B1 * | 6/2007 | Lee .................... G02B 7/02 257/294 |
| 7,990,632 | B2 | 8/2011 | Monti |
| 8,675,127 | B2 * | 3/2014 | Nakajima ............ H04N 5/2253 348/359 |
| 2009/0059398 | A1 * | 3/2009 | Tsai .................... G02B 13/0025 359/819 |
| 2010/0214677 | A1 * | 8/2010 | Monti .................... G02B 7/021 359/820 |

OTHER PUBLICATIONS

Dewitt IV et al., "Rigid Body Movements of Optical Elements due to Opto-Mechanical Factors", Proc. of the SPIE vol. 5867, 58670H, (2005).

Cheng et al., "A study on the optomechanical tolerance model for lens assembly", Proc. of the SPIE vol. 6665, 66650H, (2007).

Burge, "Mounting of Optical Components—Mounting of lenses", The University of Arizona, 2011, pp. 1-46.

Yoder, Paul Jr., "Mounting Optical Components in Optical Instruments", SPIE Press (2008) p. 49.

International Search Report for corresponding International Patent Application No. PCT/CA2014/050660 mailed Sep. 24, 2014.

* cited by examiner

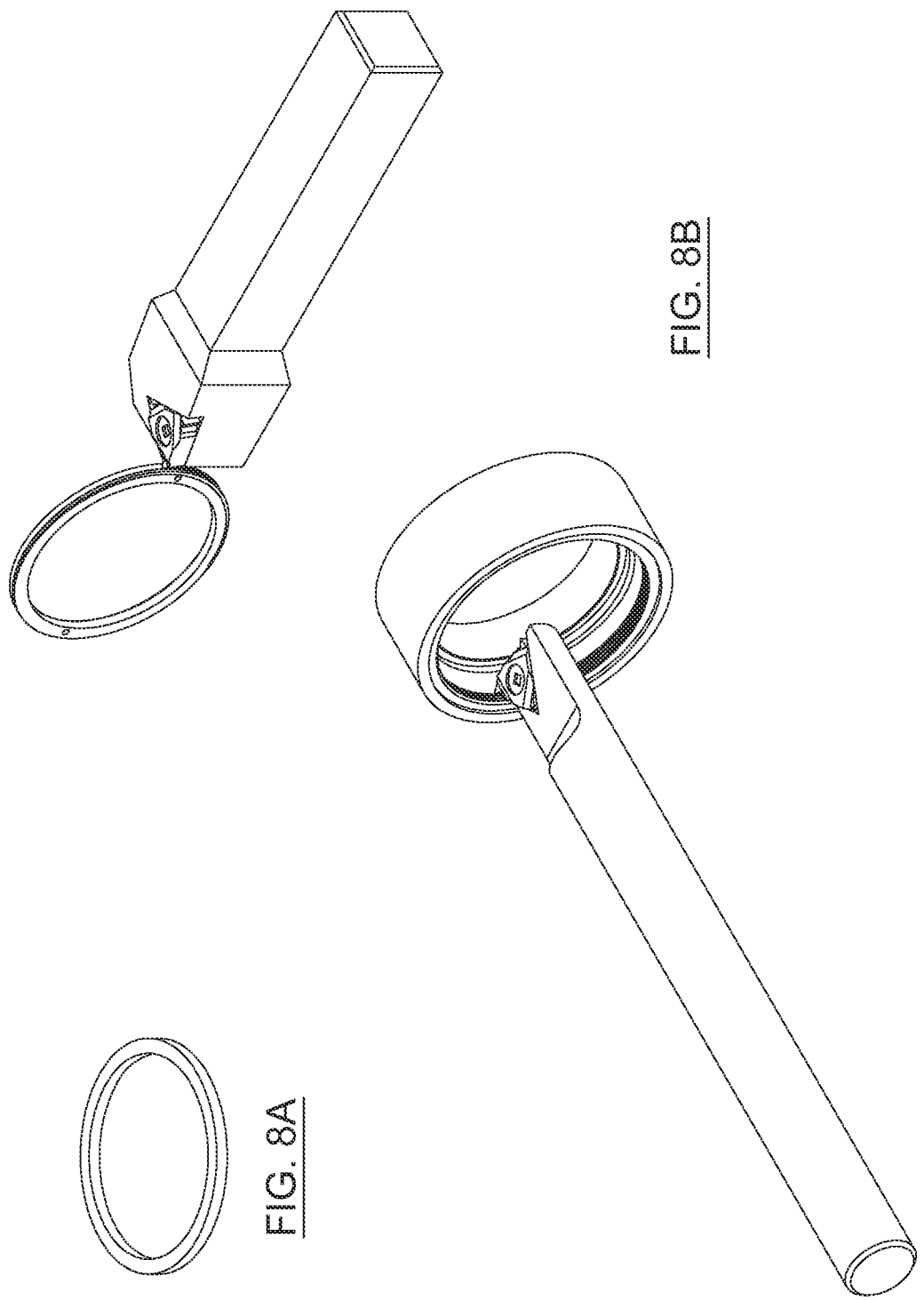

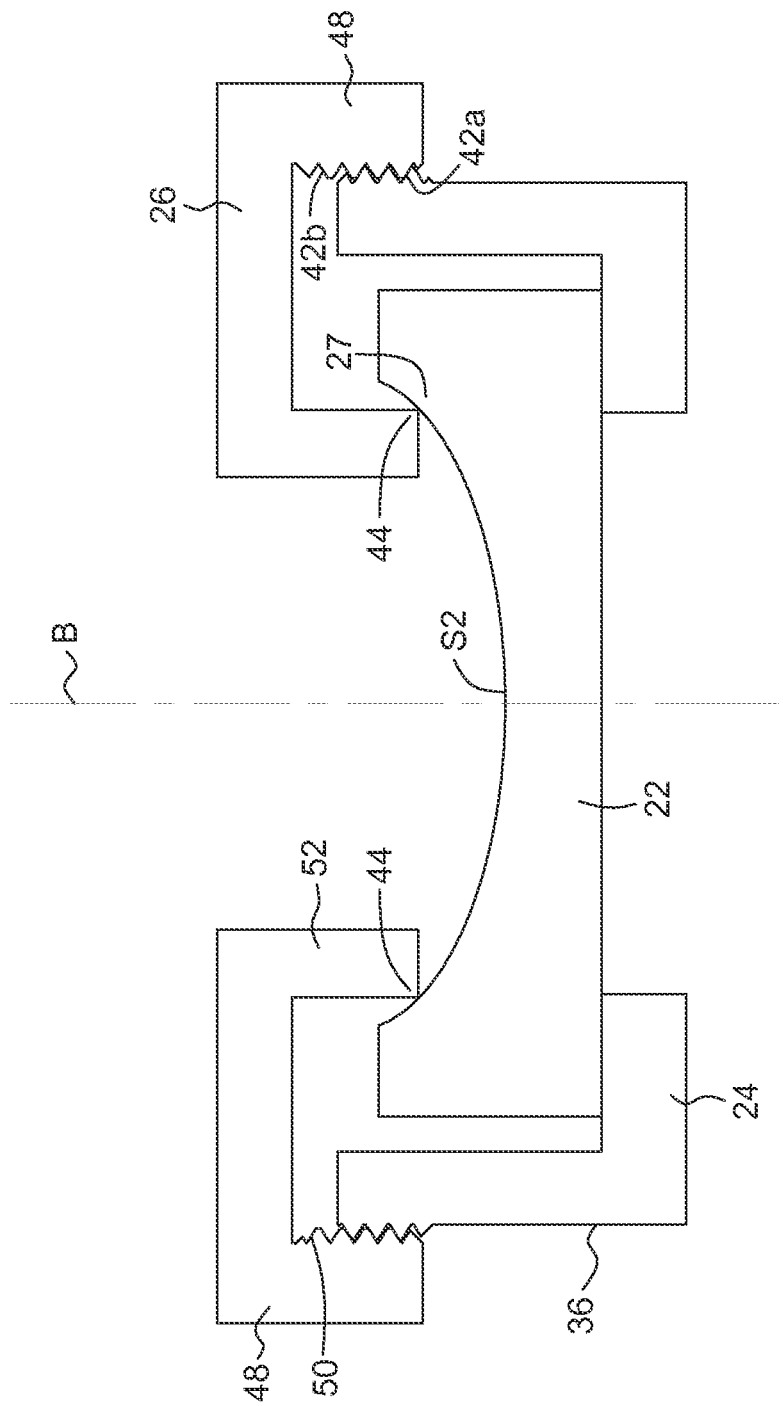

AUTO-CENTERING OF AN OPTICAL ELEMENT WITHIN A BARREL

RELATED APPLICATION

The present application claims priority to U.S. provisional application Ser. No. 61/901,846, filed on 8 Nov. 2013 and entitled "Auto-centering of an optical element within a barrel", the entire contents of which are incorporated herein by reference.

FIELD OF THE INVENTION

The present invention relates to mechanical components for optical systems and more particularly concerns an optical assembly having one or more optical elements auto-centered within a barrel, as well as a method for mounting an optical element within a barrel so that this optical element is auto-centered.

BACKGROUND

Optical elements or components are omnipresent in devices, systems or arrangements where light needs to be directed, expanded, focussed, collimated or otherwise transformed or affected. Optical elements can for example be embodied by lenses, mirrors, Diffractive Optical Elements (DOE), assemblies thereof, or the like.

In a typical optical system, most or all optical elements usually need to be precisely positioned and aligned for them to perform the correct optical function. This positioning and alignment typically involve securing the optical element in a holder or mount of some sort. Proper alignment of an optical element with respect to the holder is a delicate operation which generally requires tight manufacturing tolerances and careful handling.

Barrels are well known types of mechanical holders for optical elements. Barrels typically define a cylindrical cavity in which is mounted one or more optical elements. By way of example, a lens is a type of optical element that is often mounted in barrels. A lens, in its simplest expression, typically consists of a construction of an optical material having opposite surfaces, at least one of which being partially spherical, either convex or concave. Compound lenses, made of several different lenses arranged in a cascade, are also well known in the art.

FIG. 1 (PRIOR ART) shows a biconvex lens having first and second convex surfaces S1 and S2, illustrating the geometrical parameters characterising the lens. Each surface S1 and S2 has a corresponding center of curvature C1 and C2, which is defined as a point lying at a distance from the surface corresponding to the radius of curvature R1 and R2 of the surface, at a normal vector. In other terms, the center of curvature C1 or C2 may be imagined as the center of a sphere SP1 or SP2 of which the corresponding surface S1 or S2 of the lens would be a portion. The optical axis A of the lens can be defined as the line joining the centers of curvature C1 and C2 of both opposite surfaces S1 and S2 of the lens.

A lens generally needs to be centered with a precision that can be of the order of a few micrometers, taking under consideration all the parameters defined above. Opto-mechanical assemblies in which lenses are mounted and precisely centered are known in the art. Referring to FIG. 2 (PRIOR ART), there is shown a typical assembly 20 including a lens 22, a barrel 24 and a retaining ring 26. The lens 22 is mounted in the barrel 24 with the periphery of one of its surfaces S1 in contact with a lens seat 28. The retaining ring 26 is typically threaded within the barrel 24 and abuts on the surface S2 of the lens 22 opposite to the lens seat 28, thus securing the lens 22 in the assembly 20. It is well known in the art that the lens is centered when both centers of curvature C1 and C2 lie on the center axis B of the lens barrel 24.

The technique consisting in inserting a lens in a lens barrel and then securing the lens with a threaded ring is generally referred to as the "drop-in" lens technique. The centering precision obtained from this technique first depends on the minimum allowable radial gap between the lens and the barrel. Thermal effects caused by the mismatch of the respective coefficients of thermal dilatation of the lens and of the barrel materials also have an impact on the centering of the lens. Manufacturing tolerances on dimensions of the assembly components such as the diameter of the lens, the diameter of the barrel cavity and the thickness difference along the edge of the lens also affect the quality of the centering. The greater the required precision on the centering of the lens, the greater the manufacturing costs of both lens and barrel.

The main advantages of the drop-in technique are that the assembly time can be very short and that the lenses are removable. Low cost drop-in however has the drawback of a loss in centering precision. If more precision is required, the drop-in method may not be suitable and an active alignment is typically required. In this centering method, the lens is first positioned inside the cavity and its decentering relative to the reference axis of the barrel is measured. The lens is then moved to reduce the centering error. These steps can be repeated several times until the decentering of the lens complies with the centering requirements. Once centered, the lens is fixed in place with adhesive or other means. This method provides a very high level of centering accuracy, but requires expensive equipment while being time-consuming.

While the discussion above concerns mainly lenses, other types of optical elements can be mounted in a barrel using a retaining ring, and such elements are confronted with the same issues discussed above.

There therefore remains a need for an approach for mounting an optical element in a barrel which alleviates at least some of the drawbacks of known techniques.

SUMMARY

In accordance with one aspect of the invention, there is provided an optical assembly comprising a barrel defining a cavity having a center axis. The optical assembly includes one or more auto-centering optical arrangements. Each of the auto-centering optical arrangements includes:

- an optical element mounted in the cavity and having opposite first and second surfaces. The second surface has a peripheral region having a spatial profile;
- a seat provided in the cavity and engaging the first surface of the optical element;
- a set of barrel threads having a thread profile;
- a retaining ring affixed to the barrel through a set of ring threads complementary to the barrel threads. The retaining ring has an abutment engaging the peripheral region of the second surface of the optical element, thereby securing the optical element between the seat and the retaining ring.

For each of the optical arrangements, the thread profile of the barrel threads and the spatial profile of the peripheral region of the second surface are selected in view of an auto-centering condition whereby any decentering of the retaining ring and a corresponding tilt of the retaining ring with respect to the center axis of the cavity have counterbalancing effects on the centering of the optical element with respect to the center axis.

The optical element may for example be a lens, a mirror, a diffractive optical element (DOE), a pinhole or an assembly of such components.

In some embodiments, the thread profile of the barrel threads, for example the thread angle, is adjusted in view of the desired auto-centering of the optical elements. In other embodiments, it is the spatial profile of the peripheral region of the second surface of the optical element that is adjusted. In other embodiments, both these parameters can be jointly adapted.

In accordance with another aspect of the invention, there is further provided a method of mounting an optical element within a barrel, the optical element having opposite first and second surfaces, the second surface having a peripheral region. The barrel defines a cavity which includes a seat, the cavity having a center axis.

The method includes the following:
a) providing a retaining ring having an abutment for engaging the peripheral region of the second surface of the optical element;
b) determining an auto-centering condition whereby any decentering of the retaining ring and a corresponding tilt of the retaining ring with respect to the center axis have counterbalancing effects on a centering of the optical element with respect to the center axis;
c) selecting a thread profile for a set of barrel threads and a spatial profile for the peripheral region of the second surface in view of the auto-centering condition;
d) providing the barrel with barrel threads according to the thread profile as selected at step c) and the retaining ring with ring threads complementary to said barrel threads;
e) if necessary, modifying at least the peripheral region of the second surface according to the selected spatial profile therefor;
f) positioning the optical element in the cavity with the first surface abutting on the seat; and
g) threading the retaining ring with the barrel until the abutment of the retaining ring engages the second surface of the optical element, thereby securing the optical element between the seat and said retaining ring.

Further features and advantages of the present invention will be better understood upon reading of preferred embodiments thereof with reference to the appended drawings.

BRIEF DESCRIPTION OF THE DRAWINGS

FIGS. 8A to 8E illustrate steps of a method according to an embodiment of the invention.

FIG. 13 is a schematic illustration of an embodiment of an optical assembly where the retaining ring is threaded outside of the barrel, for use with an optical element having a concave second surface.

FIG. 14A shows a retaining ring threaded inside of the barrel with outward-facing barrel threads and inward-facing ring threads, and FIG. 14B is an enlarged view of a portion of an assembly where the barrel threads have a negative thread angle.

DESCRIPTION OF EMBODIMENTS

Figure 1:
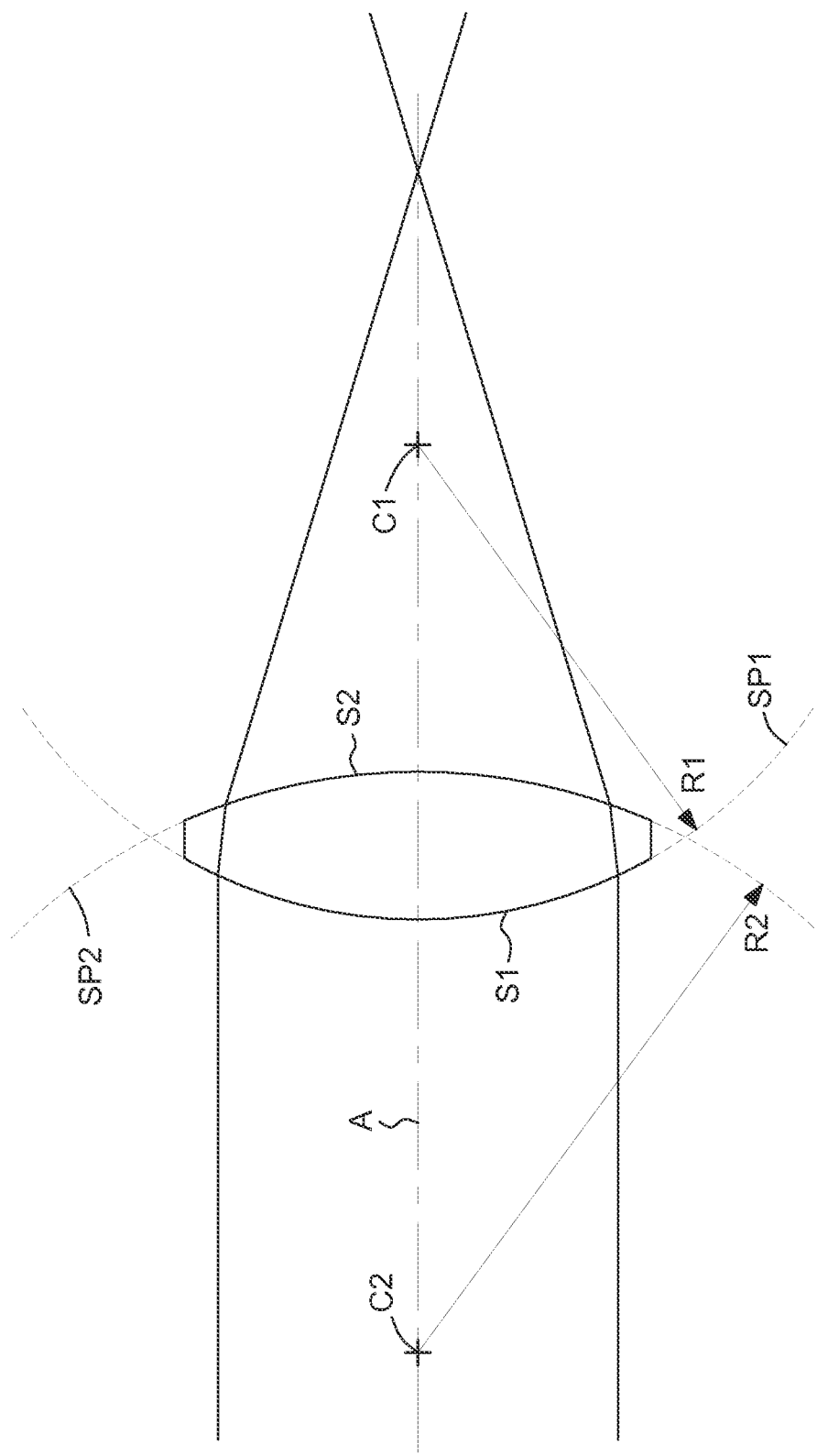
FIG. 1 (PRIOR ART) is a schematic side representation of a biconvex lens illustrating the geometrical parameters characterising lenses.
Figure 2:
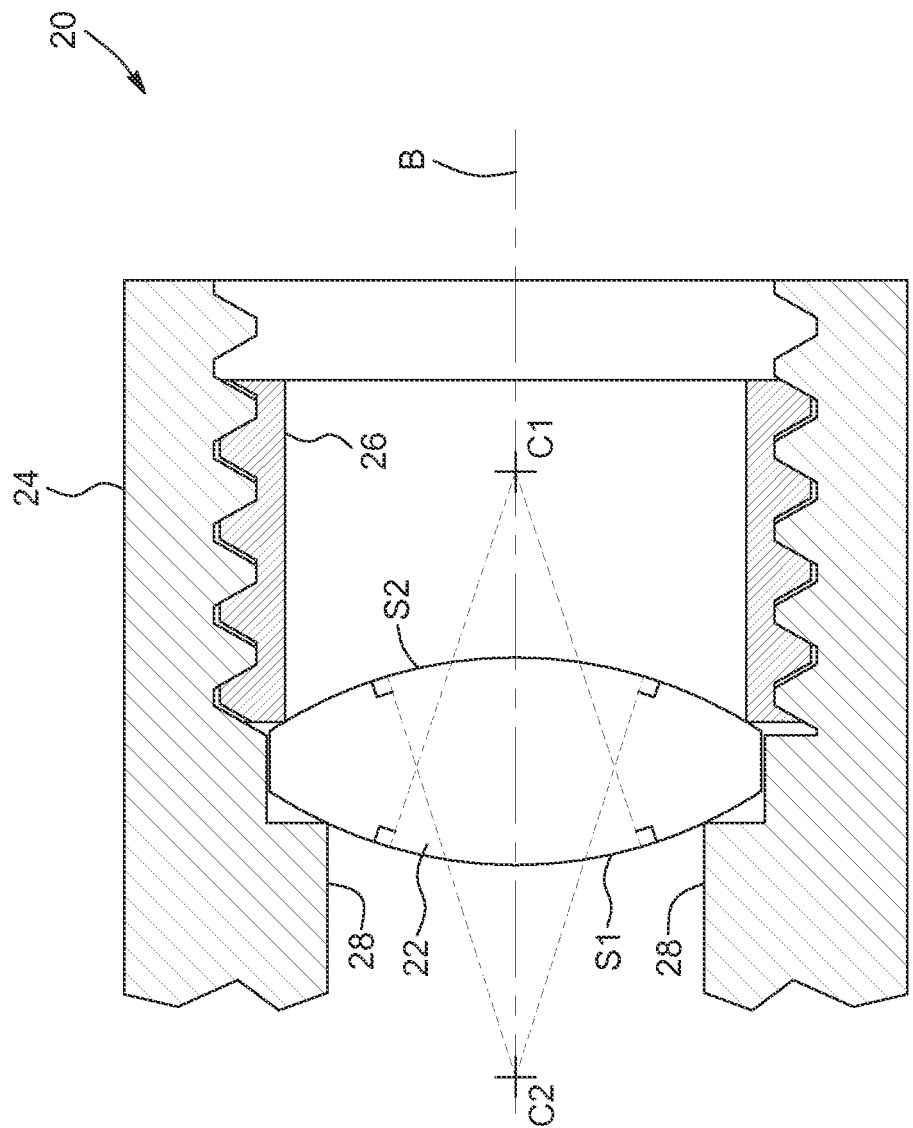
FIG. 2 (PRIOR ART) is a lens assembly showing a biconvex lens mounted in a lens barrel according to prior art.

The description below is directed to optical assemblies that provide for the auto-centering of an optical element in a barrel, simplifying the mounting and alignment of such optical elements. Embodiments of the invention relate to both optical assemblies and methods of mounting an optical element within a barrel.

The optical element may be any component or group of components acting on light in some fashion, for example to direct or change the direction of a light beam, focus or expand, collimate, filter, or otherwise transform or affect light. Examples of optical elements include lenses of any type, such as for example, plano-convex, biconvex, plano-concave, biconcave, positive or negative meniscus lenses. Cemented doublet or triplet lenses of the types listed above can also be auto-centered according to the present description. The optical element may also be embodied by diffractive lenses, mirrors, diffractive optical elements (DOEs), pinholes, or the like. The optical element may have spherical or aspherical surfaces and may have an off-axis profile. In other embodiments, the optical element may be embodied by a more complex sub-assembly of optical components such as for example one or more lenses mounted in a sleeve, a mirror or a lens mounted in a spider, a lens or a lens barrel mounted in an optical mount which is itself mounted on an optical bench, etc.

By way of example, FIGS. 3, 3A to 3C and 4 schematically illustrate an optical assembly 20 in accordance with one embodiment. The optical assembly 20 includes a barrel 24 defining a cavity 32 in which is provided one or more auto-centering optical arrangements 25. In the case illustrated in the above-mentioned figures, a single auto-centering optical arrangement 25 is provided, which includes an optical element 22 mounted in the barrel 24, a seat 28 and a retaining ring 26 securing the optical element 22 therebetween. Embodiments involving multiple optical arrangements are described further below.

The optical element 22 has opposite first and second surfaces S1 and S2. It will be noted that throughout the present description, the "first" surface denotes by convention the surface facing the seat, whereas the "second" surface extends on the side of the retaining ring. It will be understood that this convention is used for ease of reference only and is not meant to confer any particular ranking or preferred orientation or characteristics to either surface. The second surface has a peripheral region 27 which is defined as the portion thereof in contact with the retaining ring. The peripheral region has a spatial profile, defined as the local shape of the second surface S2, for example defined by its radius of curvature in the common case where the peripheral region of the second surface defines a segment of a sphere. The spatial profile of the peripheral region of the second surface influences its interaction with the retaining ring, as explained further below.

In the illustrated embodiment the optical element 22 is biconvex, that is, each surface S1 and S2 is convex and has a constant radius of curvature. The radii of curvature of these surfaces are not necessarily the same. In various embodiments of the invention, one or both of the surfaces of the optical element may be curved, either convex or concave, partially or in their entirety, in a variety of possible combinations. As explained above, embodiments of the invention may be applied to optical elements having a more complex construction than shown in FIGS. 3 and 4 such as aspherical lenses, compound lenses or other types of lenses, mirrors, DOEs, pinholes, etc. Variants of the invention involving optical elements having a shape other than biconvex will be explained further below.

The barrel 24 may be embodied by any housing structure in which an optical element 22 is to be mounted, aligned and secured in position. As mentioned above, the barrel 24 defines a cavity 32 receiving the optical element 22. Typical barrels such as the one illustrated in FIGS. 3, 3A and 4 include a hollow cylindrical housing 30 having an inner wall 34 and an outer wall 36. It will be readily understood that the barrel 24 may have any shape, mechanical features or additional components adapted to engage, connect to or otherwise interact with other structures as required by the context in which the optical element 22 is to be used. For example, the outer wall 36 of the barrel may be provided with threads, holes, pins, projections, flanges and the like without departing from the scope of the invention. Alternatively, the barrel 24 may be an integral part of a larger optical assembly, such as for example a camera objective or a microscope objective, and therefore be defined by the cavity 32 and its inner physical features, without providing a housing 30 separate from the apparatus in which the optical element 22 is used.

The cavity 32 may have any shape adapted to receive the optical element 22 therein. The cavity 32 has a center axis B, defined as its symmetry axis. The optical element 22 can be considered properly aligned within the barrel 24 when the centers of curvature of both surfaces S1 and S2 lie on the center axis B.

As mentioned above and best seen in FIG. 3B, the auto-centering optical arrangement 25 includes a seat 28 provided in the cavity and engaging the first surface S1 of the optical element 22. In some embodiments, the seat 28 is defined by an annular shoulder 38 formed in the inner wall 34 which projects inwardly within the cavity 32. In the illustrated embodiment, the shoulder 38 is shown as forming a right angle with respect to the inner wall 34 of the barrel 24, such that the first surface S1 rests on the corner edge 40 of the shoulder 38. Optionally, as illustrated, the corner edge 40 can be rounded or bevelled by polishing or machining to avoid damaging the first surface S1 of the optical element 22. It will be readily understood that in other embodiments the contact between the first surface and the seat 28 may be different. Furthermore, in some embodiments the seat 28 need not extend along the entire circumference of the inner wall 34 of the barrel but may include missing portions or other discontinuities, or may be embodied by a plurality of radially aligned projections spaced apart along the inner wall. In other implementations, the seat 28 may be embodied by a separate structure affixed to the barrel, such as for example a ring-shape component threaded to the barrel or otherwise affixed to the barrel.

Figure 5A:
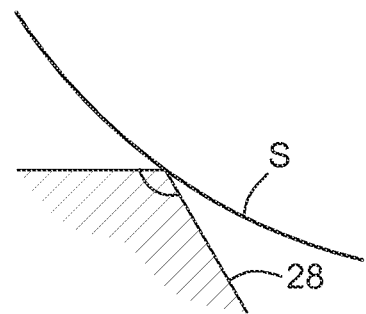
FIGS. 5A to 5E are schematic illustrations of different types of contacts between a seat and a surface of an optical element.
Figure 5B:
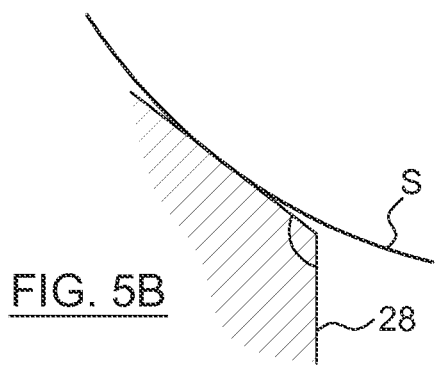
Figure 5C:
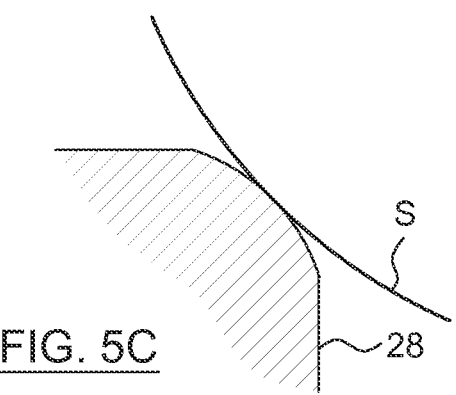
Figure 5D:
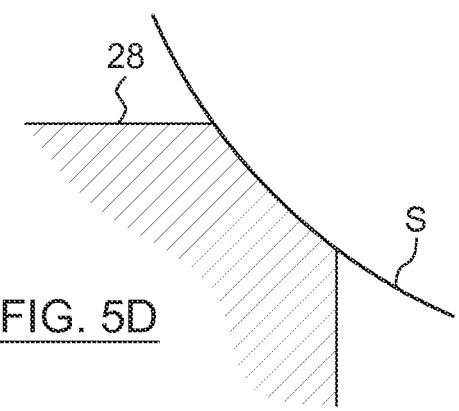
Figure 5E:
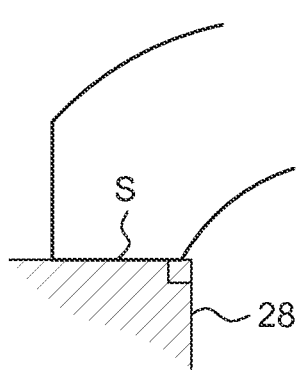

Referring to FIGS. 5A to 5E, different types of possible engagement schemes between a surface S and a seat 28, which can for example embody the engagement of the first surface of the optical element with the seat of the barrel of the present optical assembly, are schematically illustrated. FIG. 5A shows an edge contact, where the curved surface S rests on an edge of the seat 28. It can be noted that the edge need not define a right angle. FIG. 5B shows a tangential contact, where the curved surface S rests on a wall of the sear that is oriented along a tangent of the surface S at the contact point. In the variants of FIGS. 5C and 5D the seat 28 itself is curved along the contact point, with a curvature opposite to that of the surface S in FIG. 5C such that they are in toroidal contact, and with a curvature matching that of the surface S in the example of FIG. 5D to define a spherical contact. Finally, in some embodiments the surface S may be planar at least in the region where it abuts on the seat 28, enabling a planar contact such as shown in FIG. 5E.

It will be readily understood by one versed in the art, from a reading of the present specification as a whole, that the optical assembly should allow for some movement between the first surface S1 of the optical element and the seat 28, and between the second surface S2 of the optical element and the abutment of the retaining ring. In some embodiments, this implies that the optical element meets the so-called "self-centering" criterion known in the art. Self-centering refers to the capacity of the optical element to roll or slide on the seat 28. It is known to call "self-centered" an optical element that has a friction coefficient with respect to the seat and retaining ring sufficiently small to allow a rolling or other movement of the optical element. As for example known from Paul Yoder Jr., "Mounting Optical Components in Optical Instruments", SPIE Press (2008), the threshold for the friction coefficient can be expressed as:

$$\mu \leq \left| \frac{Y_{c1}}{2R_1} + \frac{Y_{c2}}{2R_2} \right| \quad (1)$$

where:
  μ is the friction coefficient between the optical element and the seat or retaining ring;
  $Y_{C1}$ is the half-diameter of contact of the first surface S1 of the optical element with the seat;
  $Y_{C2}$ is the half-diameter of contact of the second surface S2 of the optical element with the retaining ring;
  $R_1$ is the radius of curvature of the first surface of the optical element; and
  $R_2$ is the radius of curvature of the second surface of the optical element.

It is to be noted that in equation (1) the radius of curvature of each surface has a positive value for convex surfaces and a negative value for concave surfaces.

It will be readily understood that the expression "self-centering" explained above and regularly used in the art refers to a different concept than the "auto-centering" of the present application, as will be explained in more details below.

Figure 3:
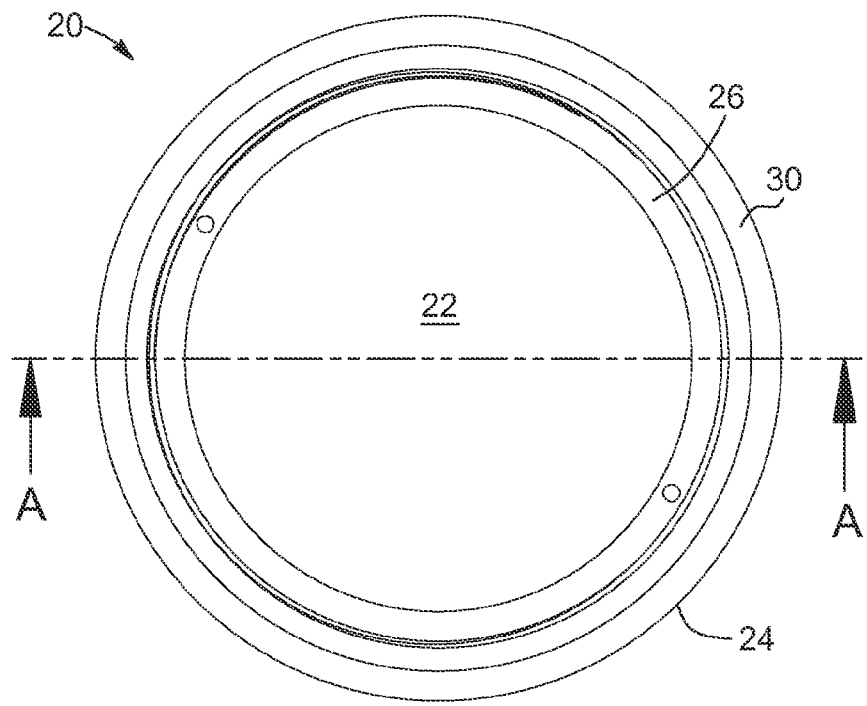
FIG. 3 is a schematic top view of an optical assembly according to one embodiment.
Figure 3C:
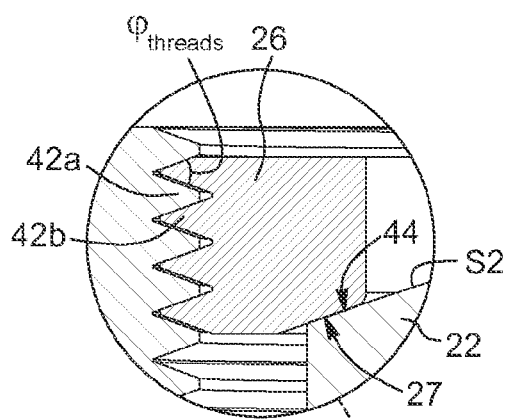
FIG. 3C is an enlarged view of a portion of FIG. 3A showing the engagement of the peripheral region of the second surface of the optical element with the retaining ring.
Figure 3B:
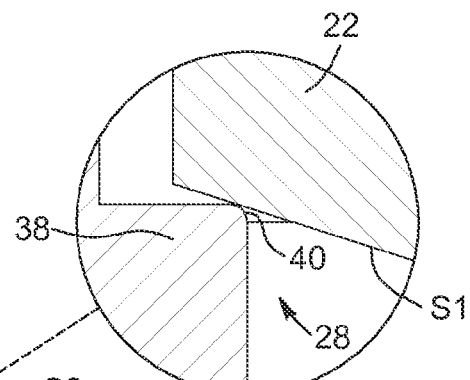
FIG. 3B is an enlarged view of a portion of FIG. 3A showing the engagement of the first surface of the optical element on the seat of the barrel.
Figure 3A:
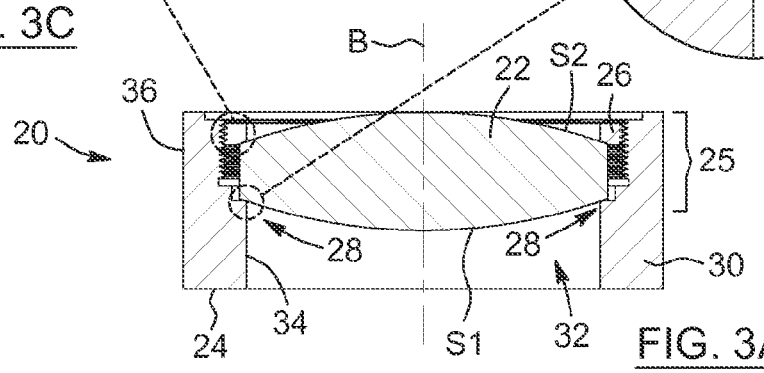
FIG. 3A is a cross-sectional view taken along line AA of FIG. 3.
Figure 4:
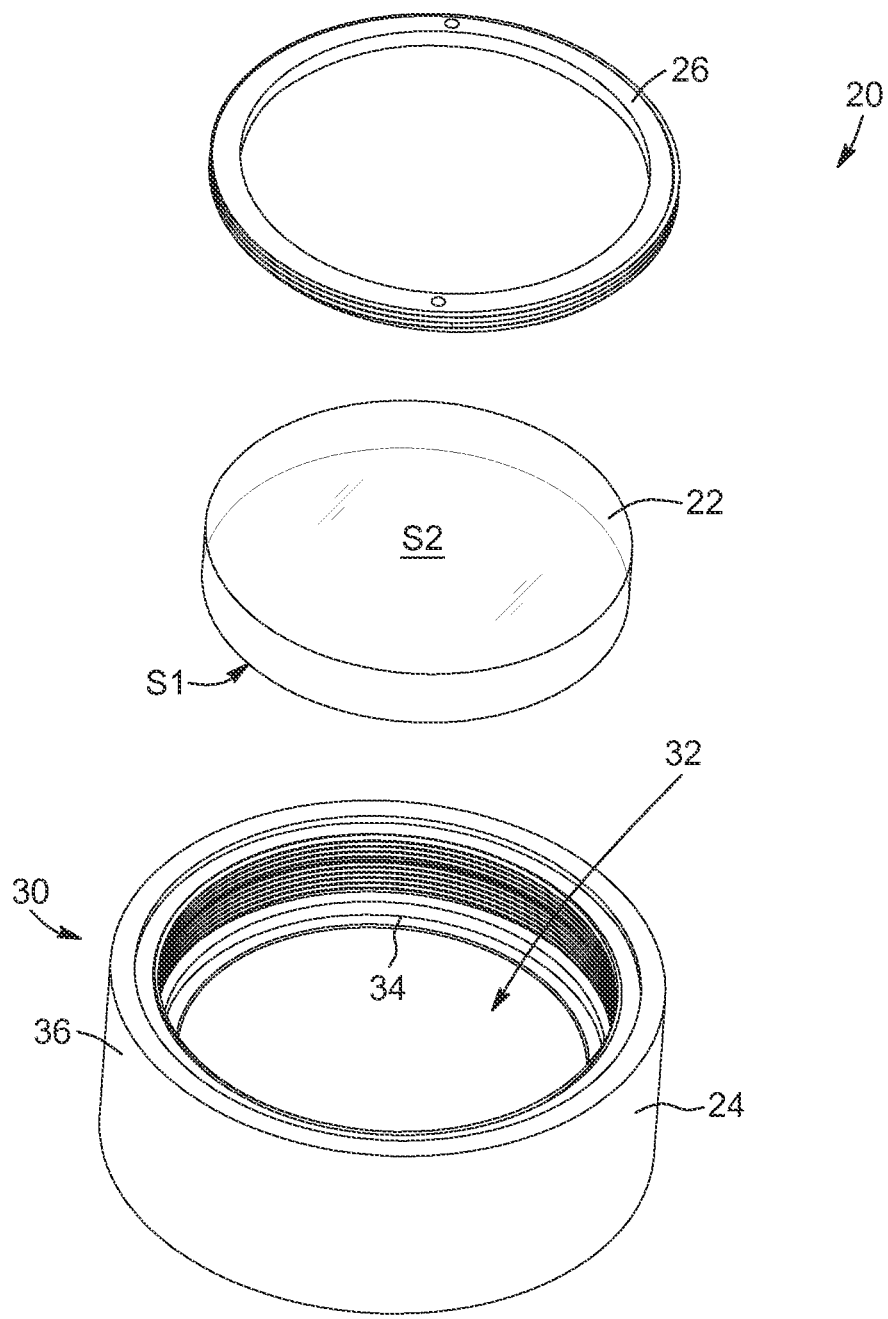
FIG. 4 is an exploded view of the optical assembly of FIG. 3.

Referring now more particularly to FIGS. 3A and 3C, the barrel 24 is provided with a set of barrel threads 42a. The retaining ring 26 is affixed to the barrel 24 through a set of ring threads 42b complementary to the barrel threads 42a. The expression "threads" is meant to refer to engageable helicoidal projections on two components allowing one component to be screwed on or within the other. By convention, a single thread is generally considered to be the portion of a helicoidal projection corresponding to one screw turn, whereas the length of the projection defining the entire screw path is referred to as threading or a set of threads. As their names entail, the barrel threads are provided along a wall of the barrel whereas the ring threads are provided along a wall of the retaining ring. In the illustrated embodiment the barrel threads are disposed along the inner wall 34 of the barrel 24 whereas the ring threads are along the outer perimeter of the retaining ring 26, such that the retaining ring can be screwed inside the cavity 32. The threads 42a, 42b may be positioned such that the retaining ring is screwed on the outside of the barrel, as explained below with respect to other embodiments. It will be readily understood that either set of threads 42a, 42b need not be continuous along the entire screw path, but may include missing segments or other discontinuities as long as sufficient contact points are provided to allow engagement of the complementary threads.

Figure 6A:
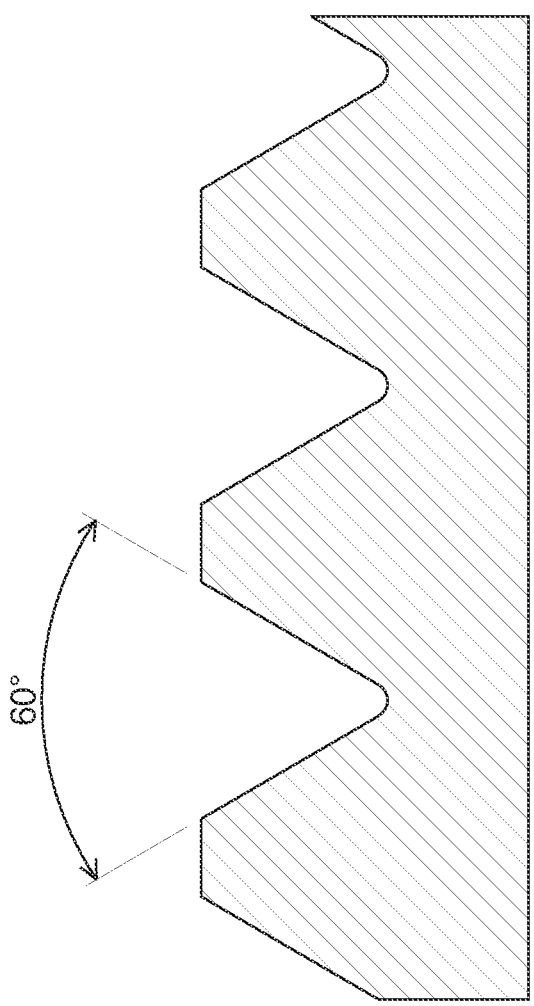
FIGS. 6A to 6E are schematic illustrations of different thread profiles.
Figure 6B:
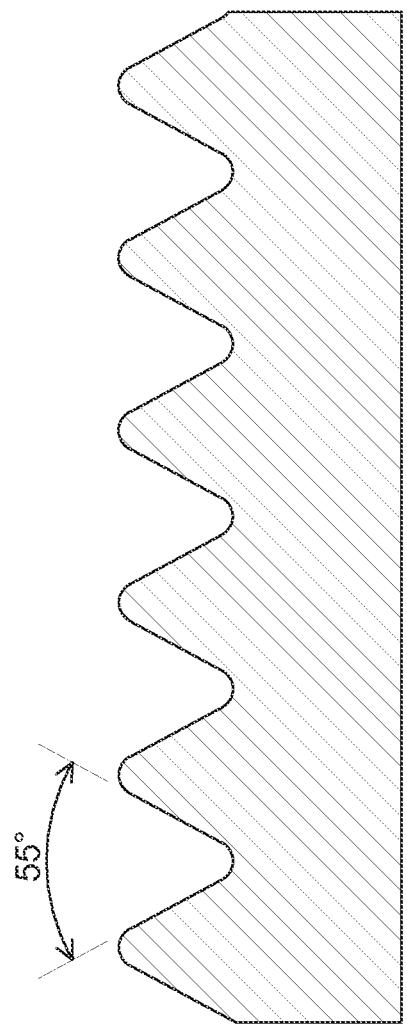
Figure 6C:
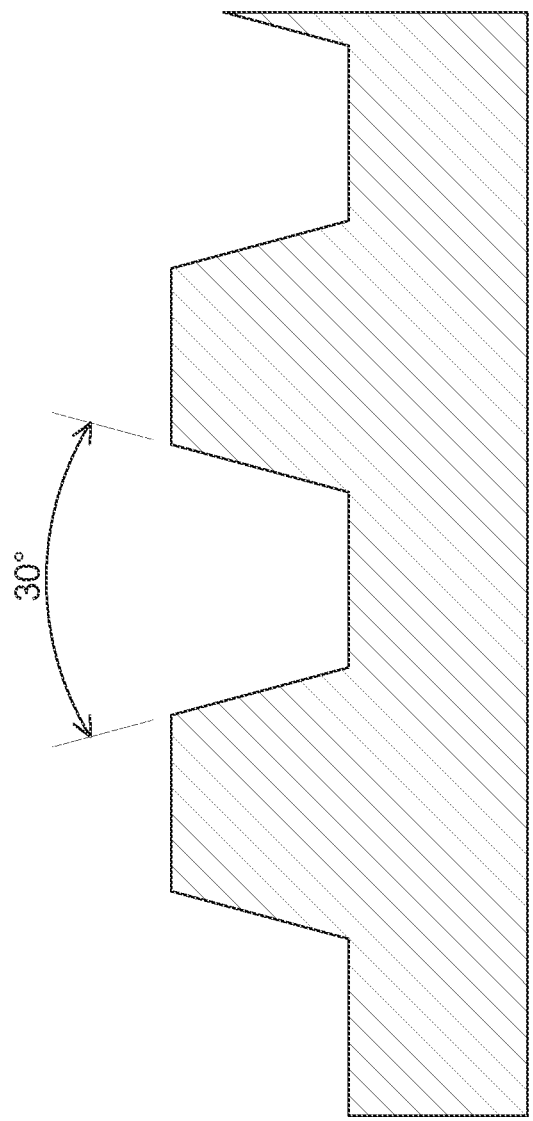
Figure 6D:
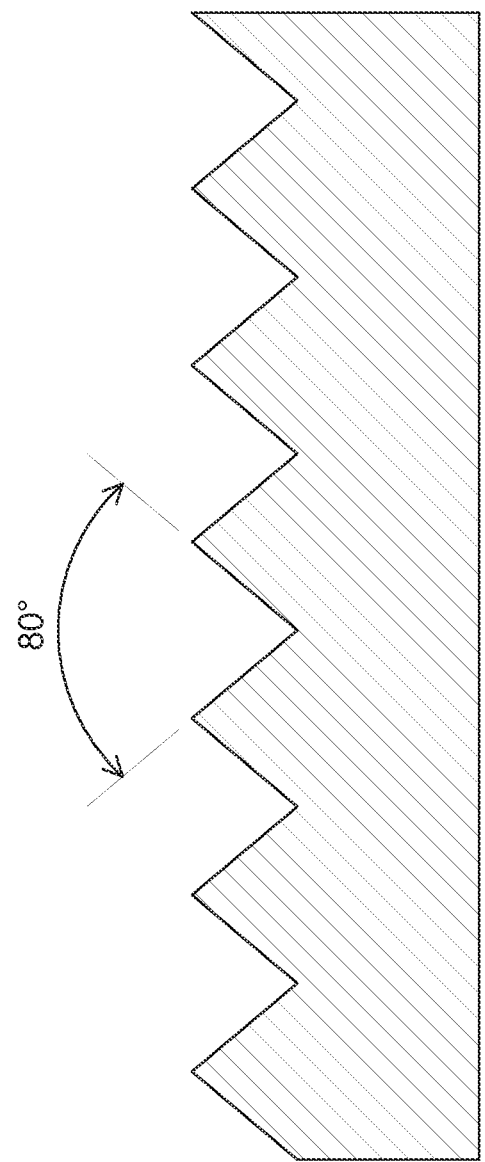
Figure 6E:
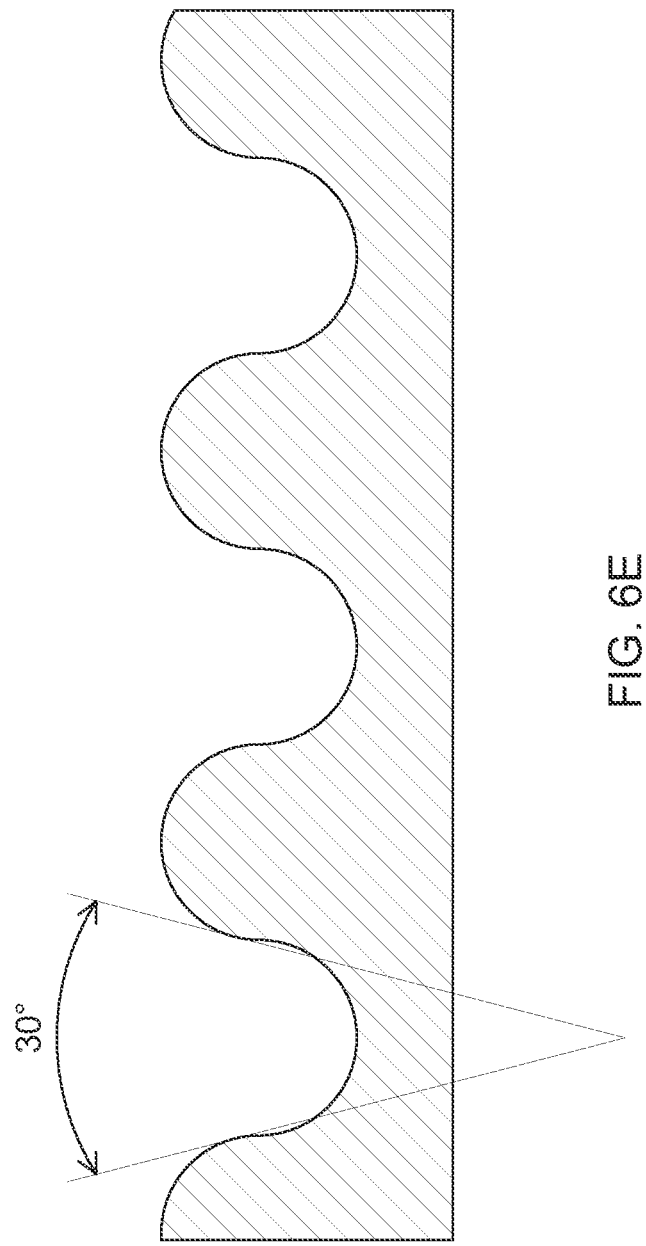

The barrel threads 42a and ring threads 42b have complementary thread profiles. The expression "thread profile" refers to the cross-sectional shape, angle and pitch formed by the threads of a given set. By definition, the thread angle is the angle formed by the opposite walls of a thread, while the pitch of a thread set is the spacing between two consecutive crests in a set of threads. Referring to FIGS. 6A to 6E, various thread profiles are illustrated, by way of example. FIG. 6A shows a truncated triangular thread profile with a thread angle of 60°, which is representative of a common thread standard. The crest of each thread is shown as truncated, although in different embodiments the thread shape may define a regular triangle. In the example of FIG. 6B, the crests and grooves of the threads are shown as having a rounded profile, and the thread angle is shown as 55°. The thread profiles shown in FIGS. 6A and 6B are commonly used for mounting optical components. However, other thread profiles are also known in the art, such as a trapezoidal profile (FIG. 6C), a regular triangular profile (FIG. 6D) and a rounded profile (FIG. 6E). In other variants, the thread profiles may be non-symmetrical, that is, the opposite walls of a thread may be oriented at different angles with respect to a plane perpendicular to the center axis of the cavity, as explained in further details below. Of course, the shapes and thread angles shown herein are given by way of example only and should not be construed as exhaustive representations of possible thread profiles.

By <<complementary>>, it is understood that the profiles of the barrel threads 42a and ring threads 42b are such that they can be screwed together, which usually involves a same pitch. Although the barrel threads 42a and ring threads 42b are shown as having a same overall profile in the illustrated embodiments, in other variants they may have different shapes as long as the complementary condition as explained above is met.

Referring back to FIG. 3C, the retaining ring 26 has an abutment 44 engaging the peripheral region 27 of the second surface S2 of the optical element 22, thereby securing the optical element 22 between the seat and the retaining ring. In the illustrated embodiment of FIG. 3O, the abutment 44 is defined by a bevelled inner edge of the retaining ring 26 which contacts the peripheral region 27 of the second surface S2 of the optical element 22. Optionally, as illustrated in the embodiment of FIG. 3C, the abutment 44 may end in a rounded corner to avoid damaging the second surface S2. However, in other embodiments the abutment may have a straight edge shape. Of course, other types of engagements, such as for example those illustrated in FIGS. 5A to 5D, may also be considered. It will be readily understood that the abutment 44 may alternatively be embodied by different structures allowing a suitable contact between the retaining ring 26 and the peripheral region 27 of the second surface S2.

For example, in some assemblies the abutment 44 may have an irregular shape providing distributed discrete points of contact with the peripheral region of the second surface S2.

In accordance with one aspect of the invention, for each optical arrangement 25, the thread profile of the barrel threads 42a and the spatial profile of the peripheral region 27 of the second surface S2 are selected in view of an auto-centering condition whereby any decentering of the retaining ring 26 and a corresponding tilt of the retaining ring 26 with respect to the center axis B have counterbalancing effects on the centering of the second surface S2 of the optical element 22 with respect to the center axis B. The section below provides explanations on this auto-centering condition and the impact thereon of the physical parameters of the optical assembly.

Auto-Centering Condition

As mentioned above, the auto-centering condition is related to the counterbalancing effects of two different factors: the decentering of the retaining ring and the tilt of the retaining ring.

The reasoning below provides a practical example of how the auto-centering condition can be determined in a case where the peripheral region of the second surface has a spherical spatial profile which is a section of the entire second surface S2, such that this spatial profile can entirely be defined by the radius of curvature of the second surface. Furthermore, in this example the thread profile of the barrel and ring threads has a trapezoidal shape and is therefore entirely characterised by the thread angle. It will however be understood that the concepts of the present section can be extended to different spatial and thread profiles without departing from the scope of the invention. Considerations for the generalization of the principles illustrated in the present section are provided further below.

Figure 7A:
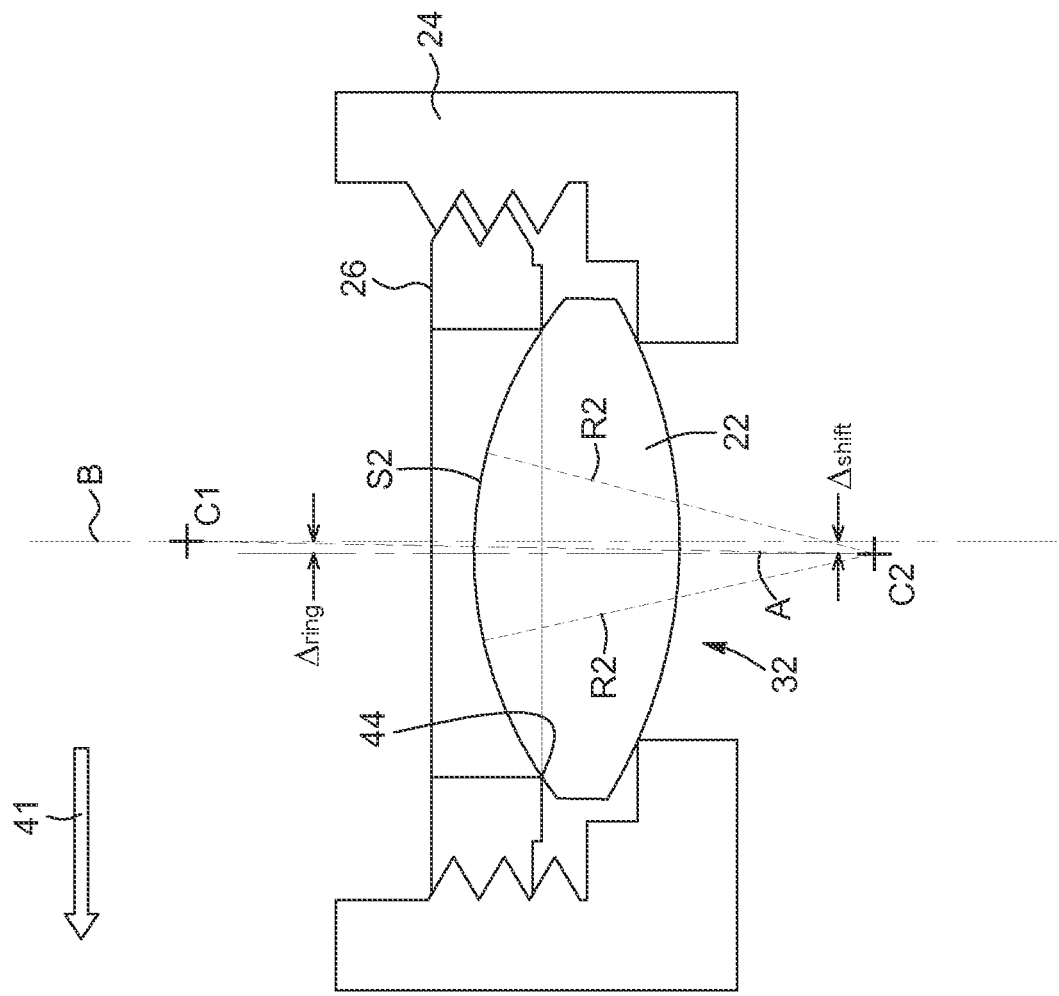
FIG. 7A is a schematic exaggerated illustration of the impact of the decentering of the retaining ring of an optical assembly on the centering of the optical element within the barrel.

Referring to FIG. 7A, the impact of the decentering of the retaining ring 26 on the centering of the optical element 22 is illustrated, using a biconvex geometry for the optical element by way of example. It will be readily understood that FIG. 7A is not drawn to scale and that the decentering of the retaining ring 26 is shown thereon in an exaggerated and unrealistic fashion, for illustrative purposes. As apparent from this illustration, the retaining ring 26 has a lateral play within the cavity 32, allowing its center to be shifted laterally by a few tens of micrometers on either side of the center axis B. In FIG. 7A, the retaining ring 26 is shown (exaggeratedly) shifted to the left side 41 of the cavity 32 by a distance $\Delta_{ring}$. As a result, the center of curvature C2 of the second surface of the optical element is itself shifted with respect to the center axis B of the cavity 32 by a distance $\Delta_{shift}$. The direction and magnitude of the shift of the center of curvature C2 of the second surface are the same as the direction and magnitude of the shift of the retaining ring within the cavity, and therefore it can be considered that $\Delta_{ring} \approx \Delta_{shift}$. Reference can be made to F. DeWitt IV et al. ("Rigid Body Movements of Optical Elements due to Opto-Mechanical Factors", Proceedings of the SPIE Vol. 5867, paper 58670H, (2005)) for a corroboration of this equivalence.

The situation illustrated in FIG. 7A is not completely realistic, as a decentered threaded retaining ring 26 will also have an inherent tilt with respect to the center axis B of the cavity. This tilt is illustrated, again in an exaggerated fashion for illustrative purposes, in FIG. 7B. The threaded engagement between the retaining ring 26 and the barrel 24 results in a pivoting of the retaining ring 26 with respect to the center axis B of the cavity, referred to herein as the tilt of the retaining ring 26. The tilt of the retaining ring has an impact on the engagement between the abutment 44 of the retaining ring 26 and the second surface S2 of the optical element 22, therefore also imparting a tilt on the optical element itself. Tilting the optical element shifts the center of curvature C2 of the second surface relative to the center axis B of the cavity 32 by a distance $\Delta_{tilt}$. A clockwise tilt will shift the center of curvature towards the left, whereas a counter-clockwise tilt 43 will shift it to the right, the latter case being shown in FIG. 7B.

Figure 7B:
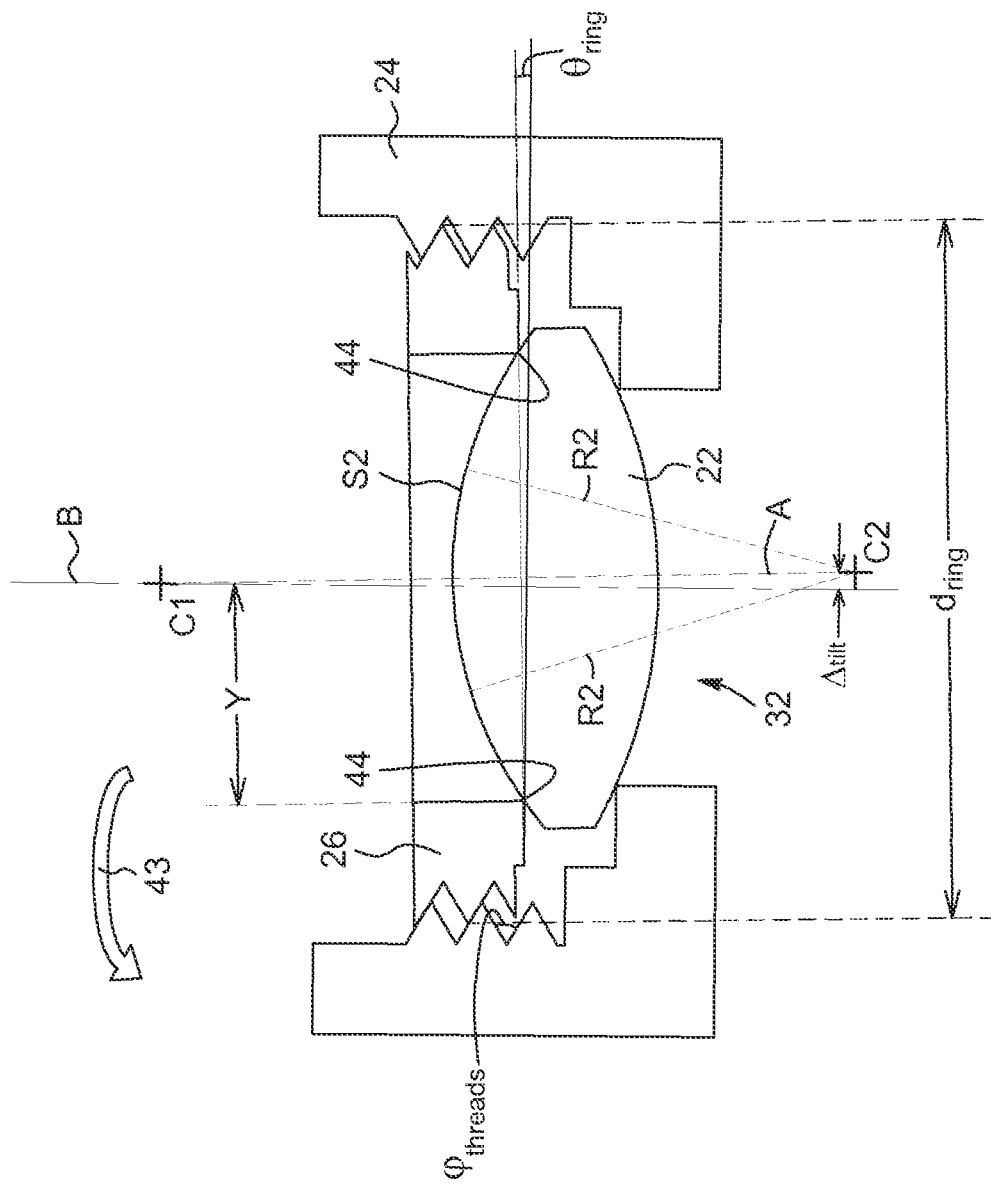
FIG. 7B is a schematic exaggerated illustration of the impact of the tilt of the retaining ring of an optical assembly on the centering of the optical element within the barrel.

In the illustrated example of FIG. 7B, the lateral decentering of the center of curvature C2 of the second surface S2 resulting from a tilt of the retaining ring can be expressed as:

$$\Delta_{tilt} = \sin(\theta_{ring})\sqrt{R^2 - Y^2} \quad (2)$$

where:
$\Delta_{tilt}$ (mm) is the lateral decentering of the center of curvature of the second surface resulting from the tilt of the retaining ring;
R (mm) is the radius of curvature of the second surface (denoted as R2 on the drawings);
Y (mm) is the half-diameter of the abutment of the retaining ring; and
$\theta_{ring}$ (degrees) is the tilt of the retaining ring with respect to the plane perpendicular to the center axis B of the cavity.

Of course, Equation (2) holds only for absolute values of R larger than Y.

Figure 7C:
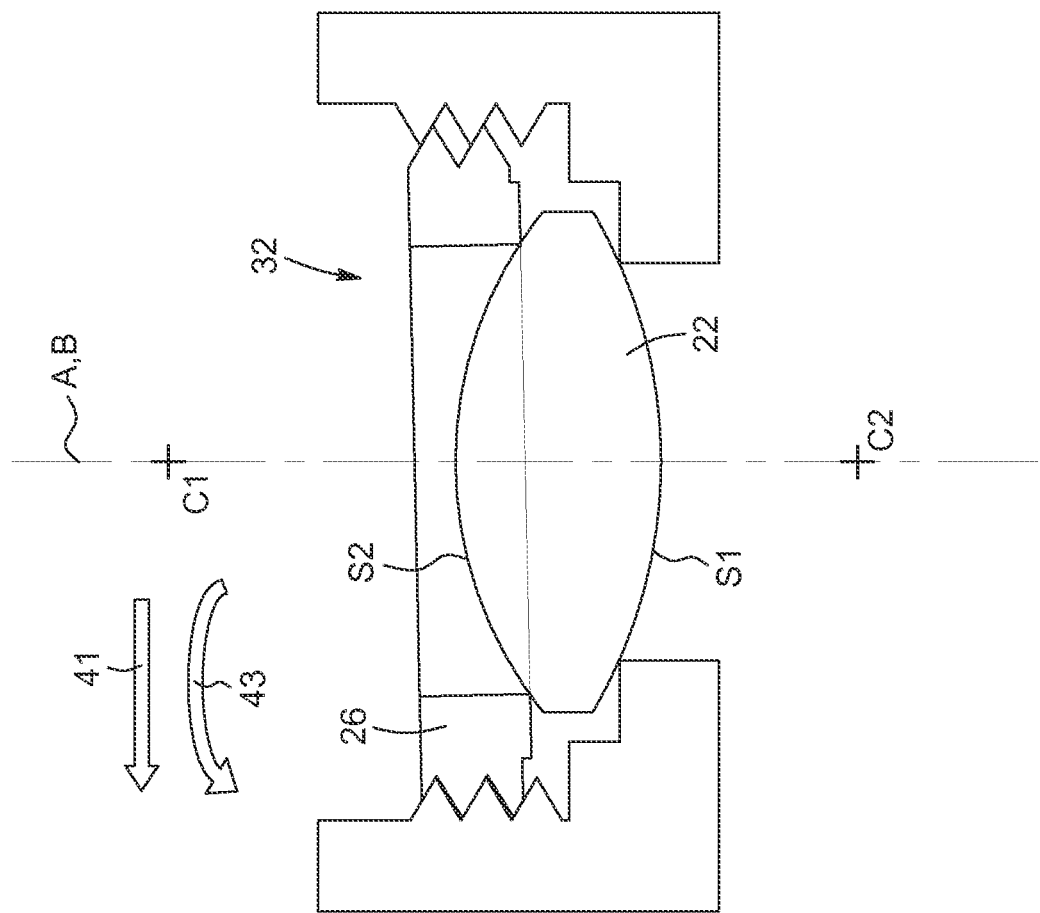
FIG. 7C is a schematic illustration of the joint impacts of the decentering and tilt of the retaining ring when the auto-centering condition explained herein is met.

The fact that the retaining ring is threaded to the barrel has for consequence that its tilt and its lateral decentering are linked to each other in a predetermined fashion. This is illustrated in FIG. 7C. In the configuration of FIGS. 7A to 7C, the retaining ring is tilted counter-clockwise if it is shifted to the left (as shown in FIG. 7C), and clockwise if it is shifted to the right. The relationship between the shift (lateral decentering) and the tilt of the retaining ring can be expressed as follows:

$$\theta_{ring} = \sin^{-1}\left[\frac{2\Delta_{ring}\tan(\varphi_{threads}/2)}{d_{ring}}\right] \quad (3)$$

where:
$\theta_{ring}$ (degrees) is the tilt of the retaining ring as defined above;
$\Delta_{ring}$ (mm) is the lateral decentering of the retaining ring;
$\varphi_{threads}$ (degrees) is the thread angle; and
$d_{ring}$ (mm) is the major diameter of the retaining ring (measured at the thread crest).

It can be demonstrated that the decentering $\Delta_{C2}$ of the center of curvature of the second surface with respect to the center axis of the cavity is the combined result of the decentering and corresponding tilt of the retaining ring with respect to the center axis:

$$\Delta_{C2} = \Delta_{tilt} + \Delta_{shift} \quad (4)$$

where the sign of $\Delta_{tilt}$ and of $\Delta_{shift}$ refers to the direction of the corresponding shift.

In order for the optical element to be centered, the decentering $\Delta_{C2}$ of the center of curvature of the second surface with respect to the center axis of the cavity should be made null or negligible, and therefore $\Delta_{C2}$ should be as close as possible to zero. Knowing, as mentioned above, that the shift $\Delta_{shift}$ of the center of curvature C2 of the second surface with respect to the center axis of the cavity is equivalent to the shift $\Delta_{ring}$ of the retaining ring within the cavity, an auto-centering condition can be defined by writing equation (4) as:

$$\Delta_{tilt} = \Delta_{ring} \quad (5)$$

which indeed implies that the decentering of the retaining ring and the corresponding tilt of the retaining ring with respect to the center axis counterbalance each other.

Still referring to FIG. 7C, the auto-centering of an optical element 22 according to the auto-centering condition is schematically illustrated, again in an exaggerated fashion for illustrative purposes. As can be seen, the retaining ring 26 is shifted laterally (to the left in the illustrated example as illustrated by arrow 41) within the cavity, and also has a tilt with respect to the center axis B (in the counter clockwise direction in the illustrated example as illustrated by arrow 43). However, as the decentering effects of these two parameters cancel each other, the optical axis A of the optical element 22, which is defined as the line joining the centers of curvature C1 and C2 of the first and second surfaces S1 and S2, nonetheless coincides with the center axis B of the cavity.

Throughout the present description references to the auto-centering condition relate to situations where the condition of equation (5) is met. As will be seen from the embodiments described below, values of various parameters can be appropriately selected to meet this condition, such as the thread angle or profile, the spatial profile of the peripheral region of the second surface of the second element, etc.

It will be noted that the auto-centering condition of the present description does not rely on the centering of the retaining ring with respect to the cavity; as a matter of fact, it uses the decentering of the retaining ring in order to provide a centering of the optical element.

Method of Mounting an Optical Element

In accordance to one aspect of the invention, a method of mounting an optical element within a barrel is presented. As explained above, the barrel defines a cavity having a seat, the cavity also having a center axis. This method may be applied to various optical elements such as defined above, the optical element therefore having opposite first and second surfaces.

Steps of the method according to an embodiment of the invention are illustrated in FIGS. 8A to 8E.

Referring to FIG. 8A, the method first includes providing a retaining ring 26. The retaining ring 26 has an abutment 44 for engaging the peripheral region of the second surface of the optical element. In the illustrated example the abutment is simply embodied by an inner edge of the retaining ring. Of course, any variants of the abutment 44 described with respect to the optical assembly could be applied in the practice of the present method. It is to be noted that at this stage the retaining ring is not yet provided with any threads, although in some embodiments the retaining rings may already have threads if the thread profile is a parameter that is fixed prior to practicing the present method.

The method further includes determining an auto-centering condition as defined above, that is, a condition whereby any decentering of the retaining ring and a corresponding tilt of the retaining ring with respect to the center axis have counterbalancing effects on a centering of the optical element with respect to the center axis.

In some embodiments, the auto-centering condition can be determined using the reasoning presented in the previous section. Hence, returning to the example of FIG. 7C, by combining equations (2), (3) and (5) above, the auto-centering condition can be rewritten as:

$$\frac{d_{ring}}{2\tan(\varphi_{threads}/2)} = \sqrt{R^2 - Y^2} \qquad (6)$$

Figure 9:
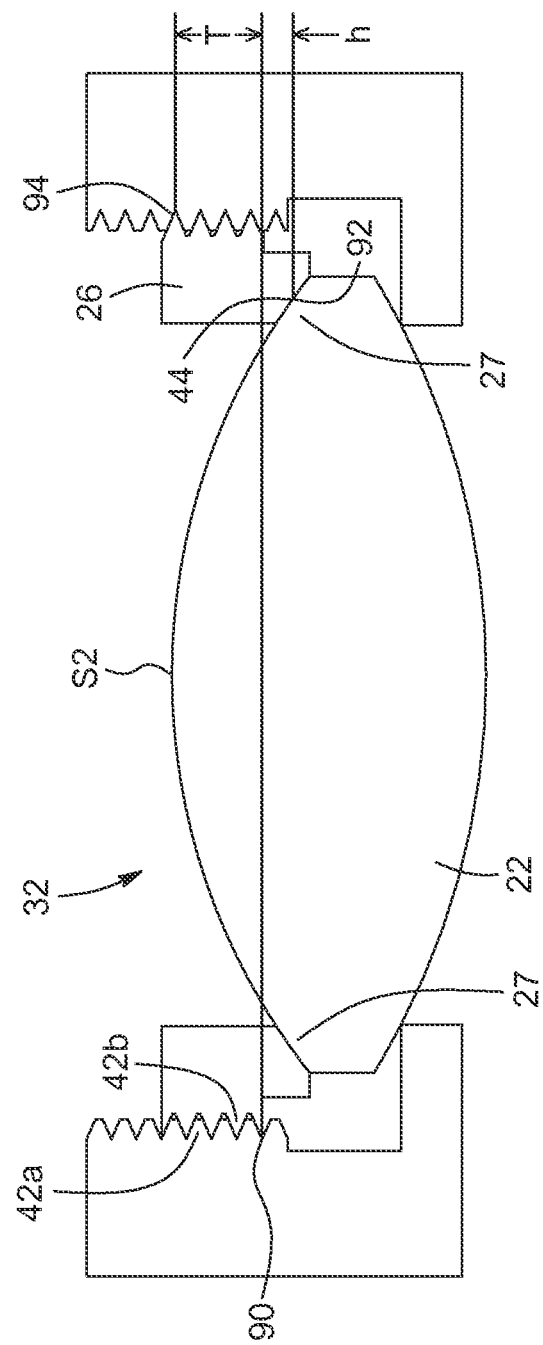
FIG. 9 is a schematic illustration of an optical assembly illustrating parameters T and h optionally used to determine the auto-centering condition.

One skilled in the art will readily understand that equation (6) above is based on a simplified model neglecting some geometrical factors having a slight impact on the decentering of the optical element. A more complex model could optionally take into account the exact shape of the retaining ring and the pitch of the barrel threads. It can be demonstrated that using such a more complex model, the auto-centering condition of equation (6) could be rewritten as:

$$\frac{d_{ring}}{2\tan(\varphi_{threads}/2)} = \sqrt{R^2 - Y^2} + h + T/2 \qquad (7)$$

where the newly introduced parameters h and T, both represented on FIG. 9, are defined as follows:

h is the distance along the longitudinal direction of the cavity between (i) a first point of contact 90 of the barrel threads 42a with the ring threads 42b proximate to the optical element 22 and (ii) a point of contact 92 of the abutment 44 of the retaining ring 26 with the peripheral region 27 of the second surface S2;

T is the distance between (i) the first point of contact 90 of the barrel threads 42a with the ring threads 42b proximate to the optical element 22 and (ii) a last point of contact 94 of the barrel threads 42a with the ring threads 42b farthest from the optical element 22 and diametrically opposite to the first point of contact 90.

One skilled in the art may make a choice between the representations of equations (6) or (7) depending on the optical assembly and on the optical requirements to be met. For example, the accuracy of the simplified equation (6) may decrease for small lens diameter and small lens radius of curvature.

One skilled in the art will note that equations (6) and (7) are based on models making two assumptions with respect to the geometry of the components of the assembly. Firstly, it is implied that the thread profile of the barrel threads is entirely defined by a symmetrical thread angle, that is, a thread profile where the opposite walls of the thread are oriented at a same angle with respect to the plane perpendicular to the center axis of the cavity. Secondly, it is also implied that the spatial profile of the peripheral region of the second surface is spherical. In other implementations, the determining of the auto-centering condition may be based on more general models. Examples of such models are provided below.

Most of the parameters involved in equations (6) or (7) above are usually predetermined by the physical specifications of the optical element and barrel according to the design requirements. However, the thread angle $\varphi_{threads}$ and the radius of curvature of the second surface R can often be controlled, separately or jointly, to meet the auto-centering condition of the optical element. One skilled in the art can therefore find a pair of values for these parameters for a particular application which meets the auto-centering condition while also taking under consideration other design requirements or limitations. It will however be understood that a practical auto-centering condition may not be available for all designs, and some parameters may need to be reconsidered, for example if the design requirements impose too large a value on the radius of curvature of the second surface or an impractical thread angle. In other scenarios, the other parameters of the auto-centering condition, such as the half-diameter of the abutment of the retaining ring Y and the external diameter of the retaining ring $d_{ring}$, could additionally be subjected to slight adjustment in order to fine tune the centering of the optical element.

The method according to an embodiment of the invention further includes selecting a thread profile for a set of barrel threads and a spatial profile for the peripheral region of the second surface in view of said auto-centering condition.

The selection of a thread profile for the barrel threads and a spatial profile for the peripheral region of the second surface in view of the auto-centering condition according to embodiments of the present invention can greatly improve the precision of the centering of the optical element in many instances. In some embodiments, one may wish to select the exact value provided for each parameter in the auto-centering condition as defined. Even with such a selection, the resulting centering of the lens cannot, in practical conditions, be perfect. The centering of an optical component in a barrel using a retaining ring can be affected by several tolerance factors. In a typical implementation, using best industry practices, the following manufacturing tolerances have to be considered:

Thread angle tolerance: ±1°;
External diameter of the retaining ring: ±0.1 mm;
Diameter of the abutment of the retaining ring: ±0.1 mm;
Radius of curvature of the second surface: ±1%.

Theoretically, the lens decenter caused by the manufacturing tolerances listed above is typically within about 3 µm. It has been demonstrated by the inventors that selecting the exact parameters of the auto-centering condition can provide, in practice, a centering of the optical element with respect to the center axis to a precision of typically 5 µm or better, including the manufacturing tolerances mentioned above. In other embodiments, where such a high precision is not necessary, one skilled in the art may wish to select values for the parameters of the design which approach, but without matching precisely, those provided by the auto-centering condition. As the decentering and tilt of the retaining ring can have an impact on the centering of the optical element which can be as high as 150 µm or more if not addressed, a significant improvement can be obtained through the selection of parameters approaching those given by the auto-centering condition. Such values are preferably selected to match values meeting the auto-centering condition within a predetermined centering requirement, imposed by a particular application. In one example, if a thread angle is adjusted in view of the centering condition, its selected value could be adjusted to the closest multiple of 5 degrees while still providing sufficient precision on the centering of the optical element for many applications. One skilled in the art will readily understand how to apply these principles in view of particular design requirements.

Various possible options for application of the present invention to different optical designs are given below.

Referring to FIG. 8B, the method next includes providing the barrel 24 with barrel threads 42a according to the thread profile as selected at the previous step, and also providing the retaining ring 26 with ring threads 42b complementary to the barrel threads 42a. In some embodiments where a non-standard thread angle is selected, the procurement of special tools to this effect may be necessary. Threading tools are known in the art and need not be described here. In other variants, for example where only the spatial profile of the peripheral region of the second surface of the optical element is to be adapted, more usual threading tools may be used. In other variants, the threads may already be provided in the barrel and/or on the retaining ring and their profile taken under consideration in the determination of the auto-centering condition.

If necessary, the method next involves modifying the second surface according to the selected spatial profile therefore, at least along the peripheral region. Such a step is illustrated at FIG. 8C. One skilled in the art will readily understand that this step is necessary solely in circumstances where the selected spatial profile is not the same as the profile already defined by the second surface along its peripheral region. Depending on the material from which the optical element is made, various techniques could be used, such as grinding, diamond turning, or any technique known by those in the art.

Figure 8D:
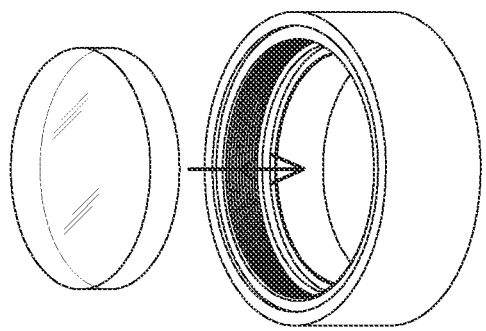

Referring to FIG. 8D, the next step of the method involves positioning the optical element 22 in the cavity 32 with the first surface S1 abutting on the seat 28. This step may be carried out according to known techniques which need not be described here.

Figure 8E:
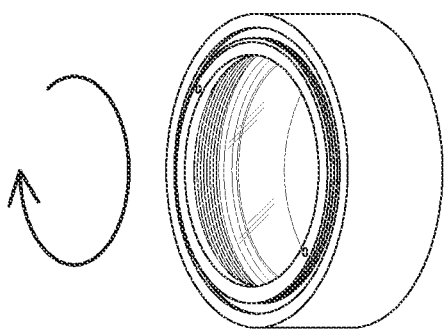
Figure 8C:
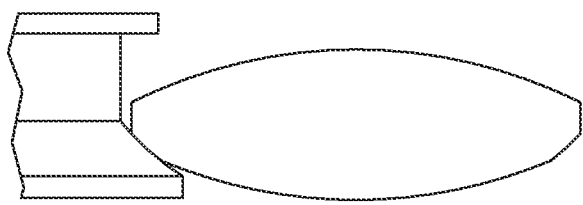

Finally, the method involves threading the retaining ring 26 with the barrel 24 until the abutment 44 of the retaining ring 26 engages the second surface 52 of the optical element 22. As one skilled in the art will readily understand, care should be taken in ensuring a proper engagement of the retaining ring with the optical element. This step is illustrated at FIG. 8E. Once this step is accomplished, the optical element 22 is secured between the seat 28 and the retaining ring 26. In accordance with the auto-centering condition, no matter the decentering of the retaining ring, its impact on the centering of the optical element will be counterbalanced by the impact of the tilt of the retaining ring, within the level of accuracy provided by the selected parameters. No further alignment techniques are required, although some may be used if desired. In some embodiments, optionally, an adhesive may be added to affix the optical element to the barrel.

For many applications, the retaining ring can remain a part of the optical assembly obtained through a method as described above. In some variants, however, the retaining ring may be used as a centering tool for positioning the optical element, and later removed from the assembly. In one example of such an embodiment, the method above may include further steps, subsequent to the threading of the retaining ring, of affixing the optical element to the seat and/or inner wall of the cavity using an adhesive or the like, and, once the optical element is secured, removing the retaining ring from the cavity.

The sections below describe several optical assemblies that can embody the present invention, by way of illustration. It will be readily understood that each of these assemblies can be manufactured according to the method above or variants thereof. It will also be understood that various aspects of the illustrated embodiments could be combined in different manners without departing from the scope of the invention. For example, different types of geometries for the first surface of the optical element could be combined with various geometries of the second surface of the optical element irrespectively of the specific combinations described herein.

Adjustment of the Thread Angle

In some embodiments, the radius of curvature of the second surface S2 is predetermined according to target optical properties of the optical element 22. For example, in the biconvex lens example of FIGS. 3, 3A to 3C and 4, the second surface S2 is spherical and has a same radius of curvature for all points therealong, which is selected in accordance with the desired focal length of the optical element. In such an embodiment, the thread profile is adjusted in view of the auto-centering of the optical element. In this example the thread profile has a triangular shape, and is characterised by the thread angle $\phi_{threads}$. Providing a thread angle value selected in view of the other parameters of equation (6) or (7) can therefore result in the auto-centering condition being met. In similar embodiments the thread profile may alternatively have a trapezoidal shape or another profile, which can be symmetrical or non-symmetrical.

Still referring to FIGS. 3, 3A to 3C and 4, and following from equation (6) above, in this embodiment the value $\phi_{threads}$ of the thread angle is determined by:

$$\varphi_{threads} = 2\tan^{-1}\left(\frac{d_{ring}}{2\sqrt{R^2 - Y^2}}\right) \quad (8)$$

Or, if the model of equation (7) is used:

$$\varphi_{threads} = 2\tan^{-1}\left(\frac{d_{ring}}{2\sqrt{R^2 - Y^2} + 2h + T}\right) \quad (9)$$

where, as explained above:
- $d_{ring}$ is a diameter of the retaining ring along the ring threads;
- R is the value of the radius of curvature of the second surface along the peripheral region thereof;
- Y is the half-diameter of the abutment of the retaining ring;
- h is the distance between (i) a first point of contact of the barrel threads with the ring threads proximate to the optical element and (ii) a point of contact of the abutment of the retaining ring with the peripheral region of the second surface; and
- T is the distance between (i) the first point of contact of the barrel threads with the ring threads proximate to the optical element and (ii) a last point of contact of the barrel threads with the ring threads farthest from the optical element diametrically opposite to the first point of contact.

As one skilled in the art will readily understand, the thread profile is not a parameter that is commonly used as a design feature. Typically, the shape and angle of the threads provided on components of an optical assembly will depend on available threading tools and/or usual thread standards. It is therefore a feature of some embodiments of the present invention that the thread profile differs from a standard thread established by a standard setting authority, such as for example the International Organization for Standardization (ISO), the American Society of Mechanical Engineers (ASME), the American National Standards Institute (ANSI) or the German Institute for Standardization (Deutsches Institut für Normung or DIN). In typical embodiments, the thread angle has a value other than 55 or 60 degrees, the most commonly used thread standards for optical assemblies.

Numerical examples of such an embodiment are provided in Table 1 below:

TABLE 1

Biconvex lens mounted in a barrel with a retaining ring threaded inside the cavity

| Parameter | Example 1 | Example 2 | Example 3 |
|---|---|---|---|
| R2 (mm) | 38.76 | 82.29 | 31.39 |
| Y (mm) | 24 | 19 | 14.25 |
| H (mm) | 0.5 | 0.5 | 0.5 |
| T (mm) | 1.98 | 1.98 | 1.98 |
| $d_{ring}$ (mm) | 53.58 | 43.71 | 34.02 |
| $\varphi_{threads}$ (degrees) | 80 | 30 | 60 |

Figure 10A:
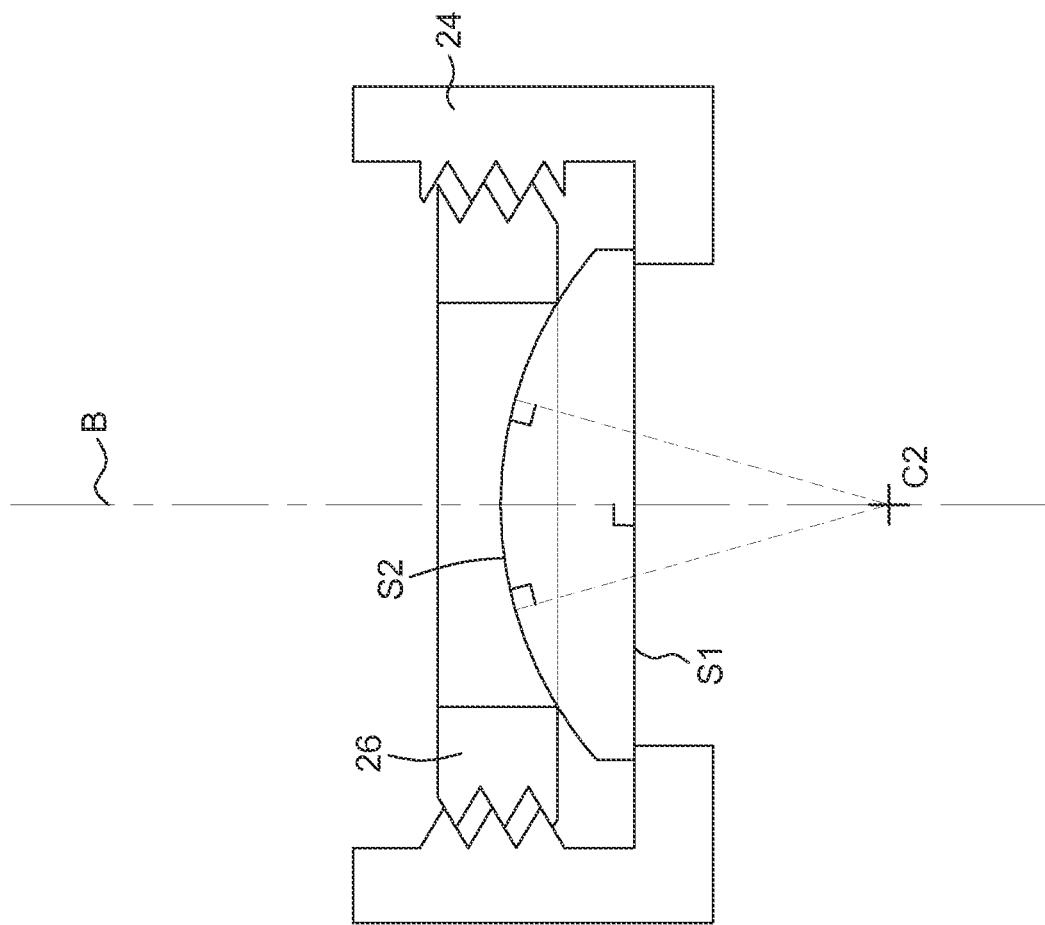
FIG. 10A is a schematic illustration of an optical assembly according to one embodiment with a planoconvex optical element.
Figure 10B:
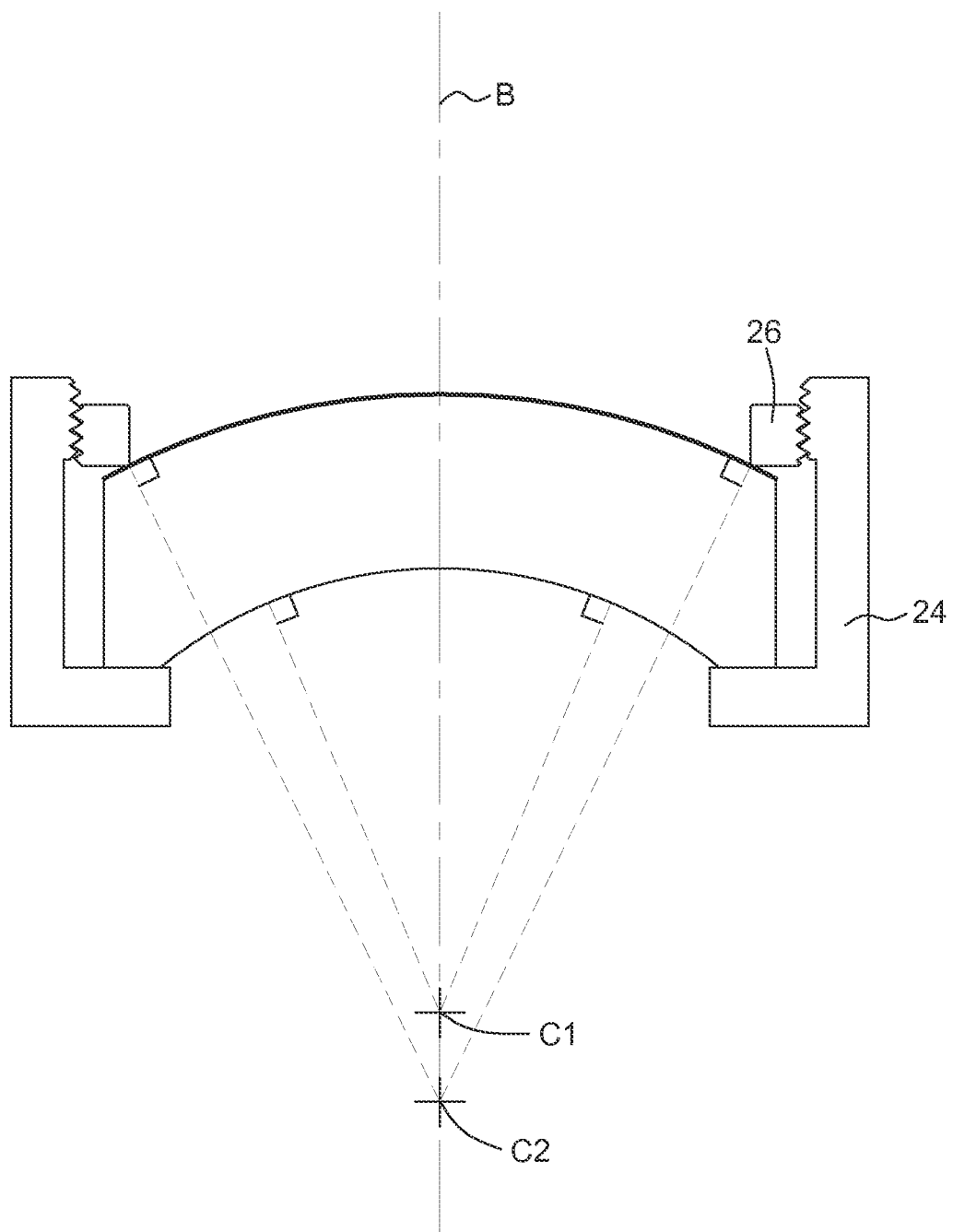
FIG. 10B is a schematic illustration of an embodiment of an optical assembly with a meniscus optical element.

It is of interest to note that in such embodiments, the centering of the optical element is not affected by the radius of curvature of the first surface of the optical element. Consequently, in similar embodiments the first surface S1 may be planar or concave and still meet the same auto-centering condition as above. Such embodiments are for example illustrated in FIGS. 10A (piano-convex configuration) and 10B (meniscus configuration).

It will be noted that in the description of the variants above, it was implicitly assumed that the barrel and ring threads have a symmetrical shape. In other words, the slope of the top wall of a thread is equal to the slope of its bottom wall, but in the opposite direction relative to a normal to the center axis of the cavity.

Figure 21:
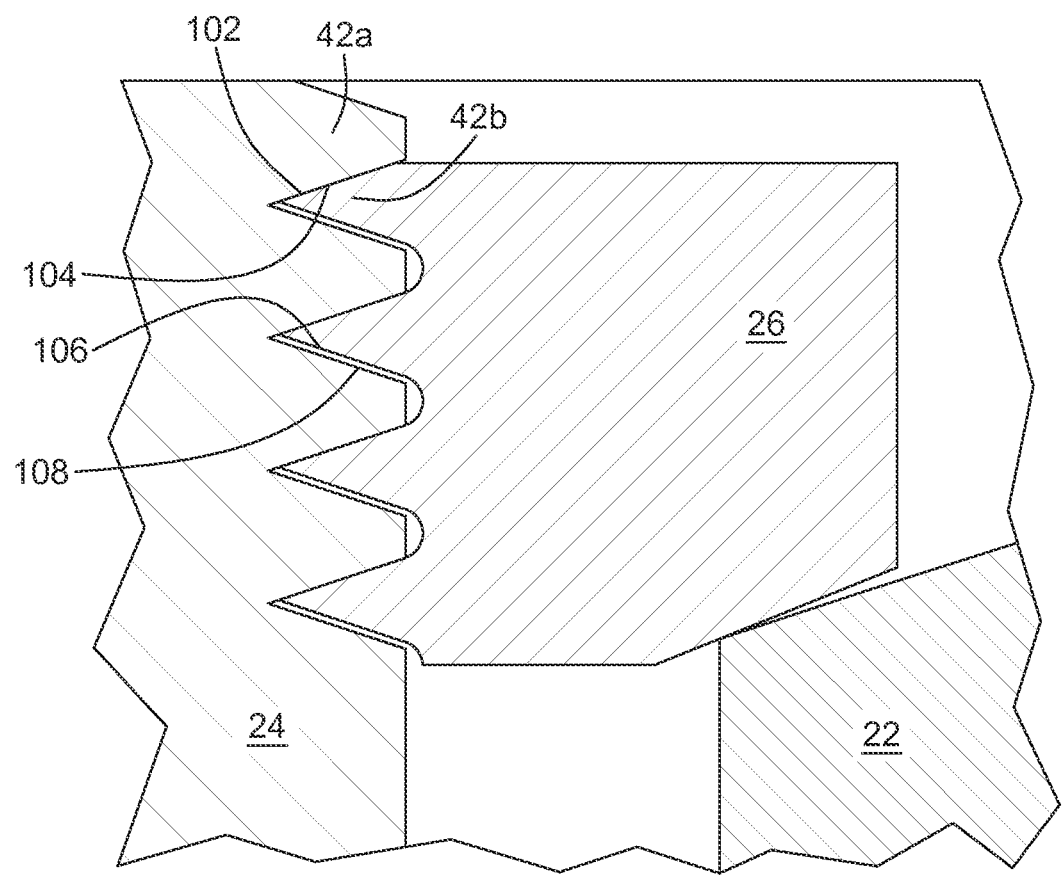
FIG. 21 is a schematic side view of a portion of an optical assembly according to one embodiment, highlighting the engagement between the respective surfaces of the barrel and ring threads.

In practice, in optical assemblies such as described herein, when the retaining ring is screwed within the barrel and abuts on the optical element the resulting mechanical forces in the system typically act to push the retaining ring away from the optical element. Referring to FIG. 21, in the illustrated frame of reference it can be seen that the barrel 24 and the retaining ring 26 are engaged in such a manner that the top surface 104 of each ring thread 42b pushes against the bottom surface 102 of a barrel thread 42a. It will be understood that the reference to "top" and "bottom" directions is used herein as shorthand for ease of reference to FIG. 21, the top surfaces being designated by convention as the surface facing away from the optical element 22, whereas the bottom surfaces face toward the optical element 22. The use of such a convention is not meant to impart any preferential orientation to the optical assembly.

In practice, the impact of the top surface 108 of each barrel thread 42a and of the bottom surface 106 of each ring thread 42b in the balance of forces within the assembly is null or negligible; the bottom surface 106 of the ring threads 42b and the top surface 108 of the barrel threads 42a do not contact each other or any other surface. As a consequence, it will be readily understood that the auto-centering condition described herein, as well as the complementarity of the ring threads 42b and barrel threads 42a, need only to apply to the surfaces contacting each other, that is, the top surface 104 of the ring threads 42b and the bottom surface 102 of the barrel threads 42a.

Figure 22:
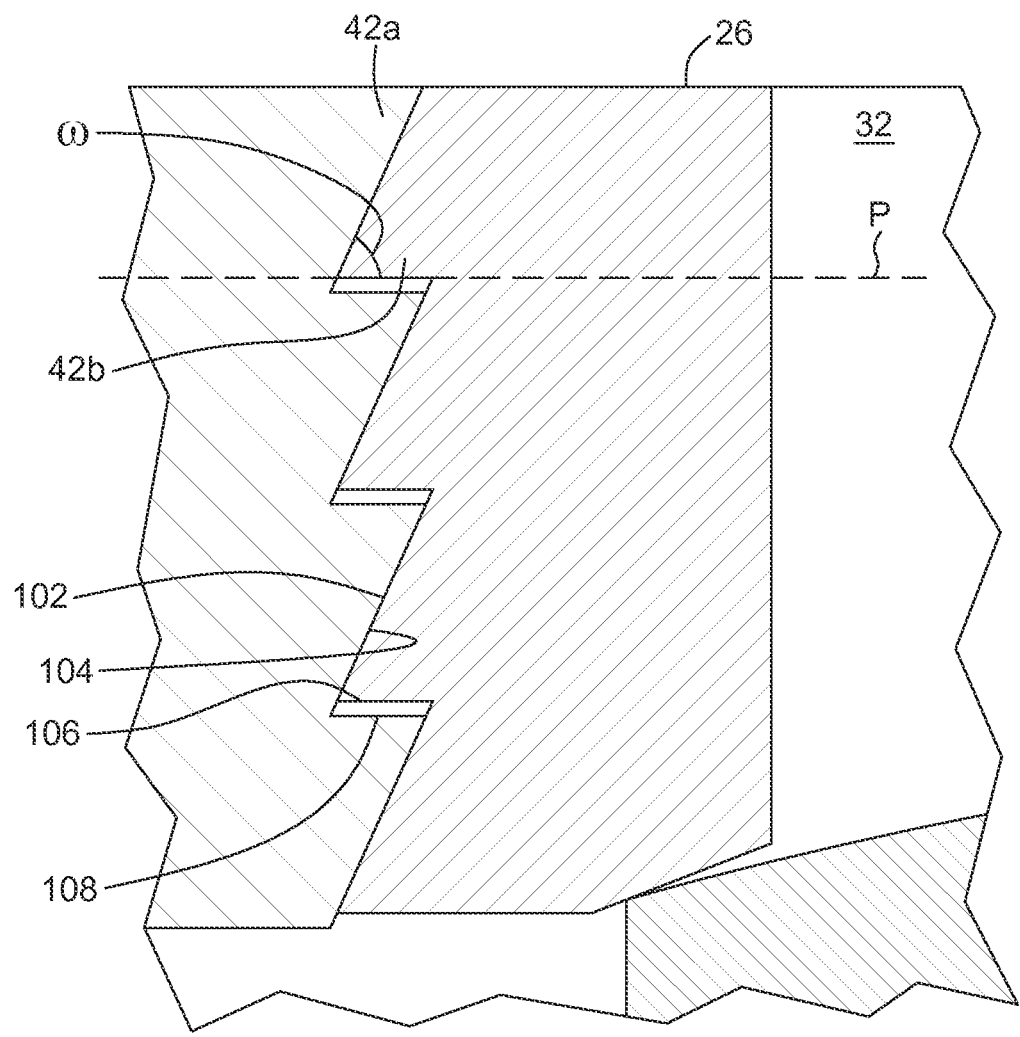
FIG. 22 is a schematic side view of a portion of an optical assembly according to one embodiment, where the barrel and ring threads have non-symmetrical shapes.

In some embodiments, the ring threads and barrel threads may have a spatial profile that is non-symmetrical with respect to the symmetry axis of the cavity or of the retaining ring. Referring to FIG. 22, such an embodiment is shown by way of example. To describe embodiments having non-symmetrical threads, it can be useful to define an effective thread angle ω. In the reference frame of the cavity, the effective thread angle o may be defined as the angle formed by the bottom surface 102 of the barrel threads 42a and a plane P perpendicular to the center axis of the cavity 32.

It will be readily understood that for cases where the threads are symmetrical, the effective thread angle ω corresponds to $\varphi_{threads}/2$, that is, half the thread angle. Consequently, alternative manners of representing the auto-centering condition can be obtained by simply replacing $\varphi_{threads}/2$ by ω in equations (6) and (7) above, obtaining:

$$\frac{d_{ring}}{2\tan(\omega)} = \sqrt{R^2 - Y^2} \quad (6')$$

or $$\frac{d_{ring}}{2\tan(\omega)} = \sqrt{R^2 - Y^2} + h + T/2 \quad (7')$$

Figure 23A:
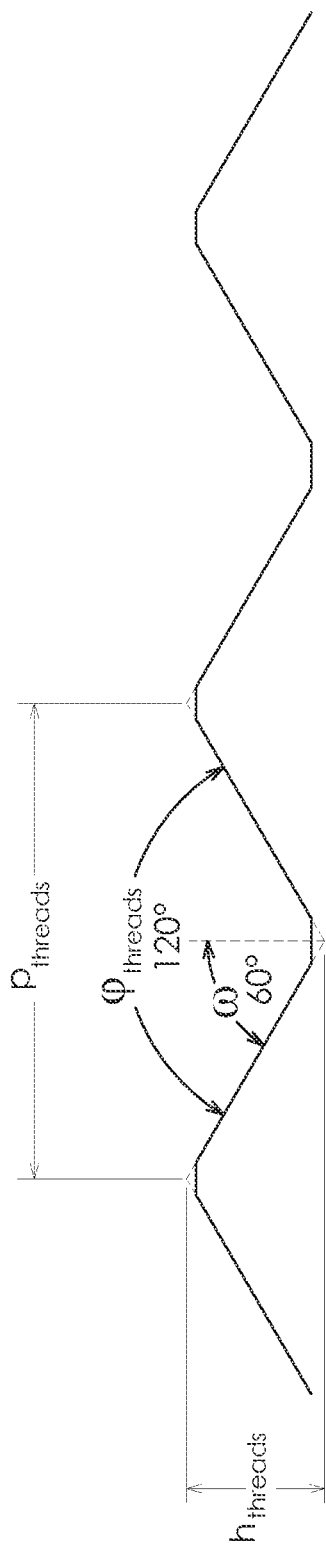
FIGS. 23A and 23B are schematized representations of symmetrical (FIG. 23A) and non-symmetrical (FIG. 23B) thread shapes having a same effective thread angle.
Figure 23B:
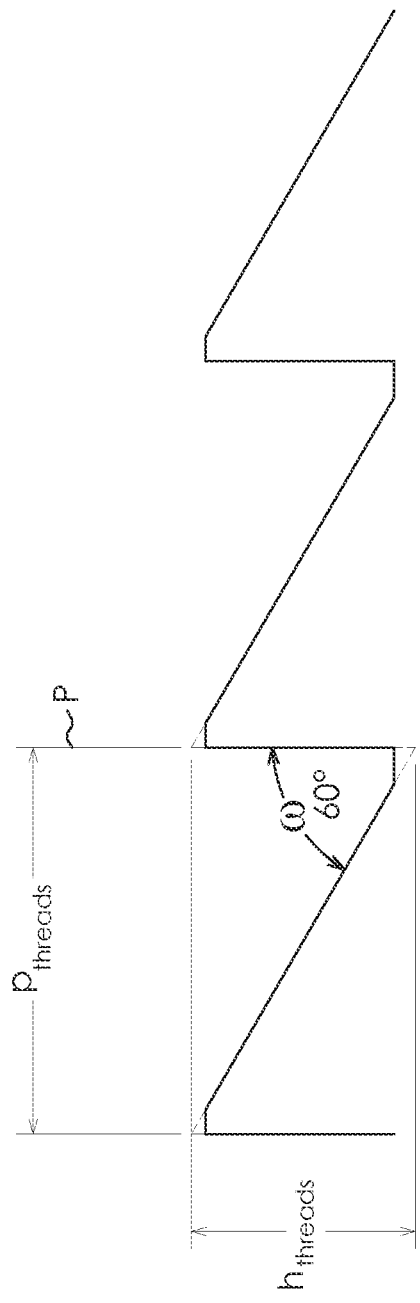

In some embodiments, a non-symmetrical thread profile may advantageously increase the available range of auto-centering, for example facilitating the use of the auto-centering condition with an optical element with a second surface having a very small radius of curvature, such as fish eye lens, as well as with an optical element with a second surface having a very large radius of curvature. To illustrate this point, FIG. 23A shows a symmetrical thread profile having a large thread angle $\phi_{threads}$ of 120°, which could be useful to meet the auto-centering condition for an optical element have a very small radius of curvature. However, such a thread profile could be challenging to manufacture since the thread height $h_{threads}$ would need to be very small for practical values of the thread pitch $p_{threads}$. As shown in FIG. 23B, by using a non-symmetrical thread profile, an effective thread angle ω corresponding to half the value of the thread angle $\phi_{threads}$ of FIG. 23A can be used, for example, corresponding to 60° in the illustrated example. This configuration allows the auto-centering condition to be met while providing, for a same thread pitch $p_{threads}$, a thread height $h_{threads}$ twice larger than for the symmetrical profile of FIG. 23A.

In the illustrated examples of FIGS. 22 and 23B, the surfaces of the barrel and ring threads that are not in contact together, and therefore do not affect the alignment of the optical element, are shown parallel to the plane P. In these embodiments the effective thread angle ω therefore corresponds to the angle formed by the opposite surfaces of a thread, for example the angle between the bottom surface 102 and the top surface 108 of the barrel threads 42a. In other words, the effective thread angle of such a configuration corresponds to the non-symmetrical thread angle $\phi_{threads}$. However, in other embodiments the surfaces of the barrel and ring threads that are not in contact together may have a different orientation, in which case the effective thread angle ω would differ from the non-symmetrical thread angle. Examples of thread profiles according to such embodiments are shown in FIGS. 24A and 24B.

Figure 24A:
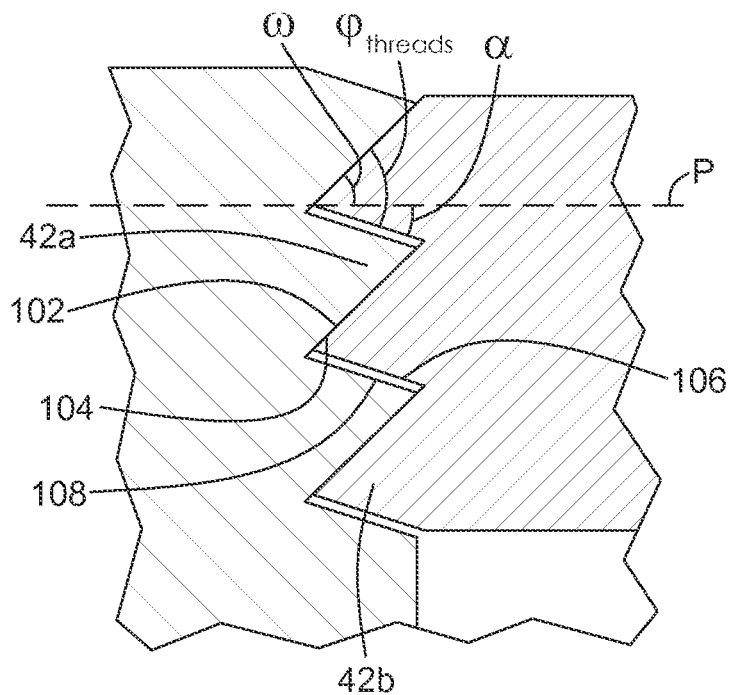
FIGS. 24A and 24B are schematized enlarged views of portions of an optical assembly where the barrel and ring threads have non-symmetrical shapes according to other embodiments.

In the configuration of FIG. 24A, the bottom surface 102 of the barrel threads 42a and the top surface 104 of the ring threads 42b define an effective thread angle ω with the plane P, whereas the bottom surface 106 of the ring threads and the top surface 108 of the barrel threads both form a same shallow angle α with respect to the plane P, the angle α being different from the effective thread angle ω. The thread angle $\phi_{threads}$ in this variant, which corresponds to the sum of the angles ω and α, is not relevant to the auto-centering condition, the effective thread angle ω being the relevant parameter to consider, as expressed in equations (6') and (7').

Figure 24B:
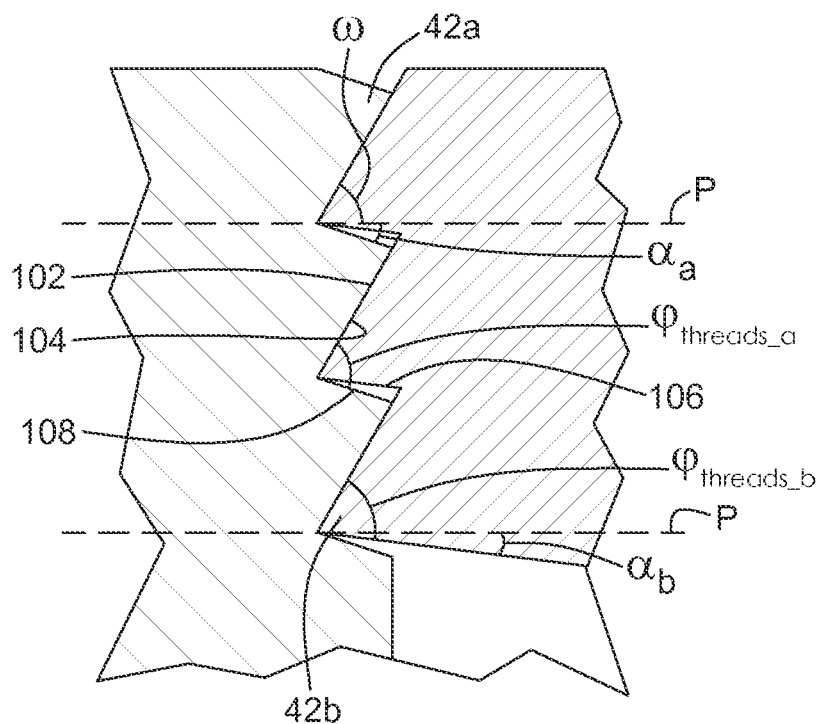

In the configuration of FIG. 24B, another non-symmetrical embodiment is shown where the top surface 108 of the barrel threads 42a and the bottom surface 106 of the ring threads 42b are shown as having different orientations, forming different shallow angles $\alpha_a$ and $\alpha_b$ with the plane P. It will be readily understood by one skilled in the art that these two surfaces need not be complementary as they do not contribute to the engagement of the retaining ring within the barrel. In such an embodiment, the thread angle $\phi_{threads\_a}$ of the barrel threads differs from the thread angle $\phi_{threads\_b}$ of the ring threads 42b. Again, in this embodiment the auto-centering condition should be evaluated taking the effective thread angle ω into account.

Adjustment of the Radius of Curvature of the Second Surface

In some embodiments, it may not be possible or desired to adjust the profile of the barrel threads and ring threads as provided in the embodiments described in the previous section. In such cases, the spatial profile of the peripheral region of the second surface of the optical element may be adjusted in view of the desired auto centering of the optical element relative to the center axis.

Referring to FIGS. 11A to 11D, embodiments are shown where the second surface S2 of the optical element 22 has a central region 46 having a spatial profile predetermined according to the target optical properties of the optical element 22 and that differs from the spatial profile of the peripheral region 27 of the second surface 22.

Figure 11A:
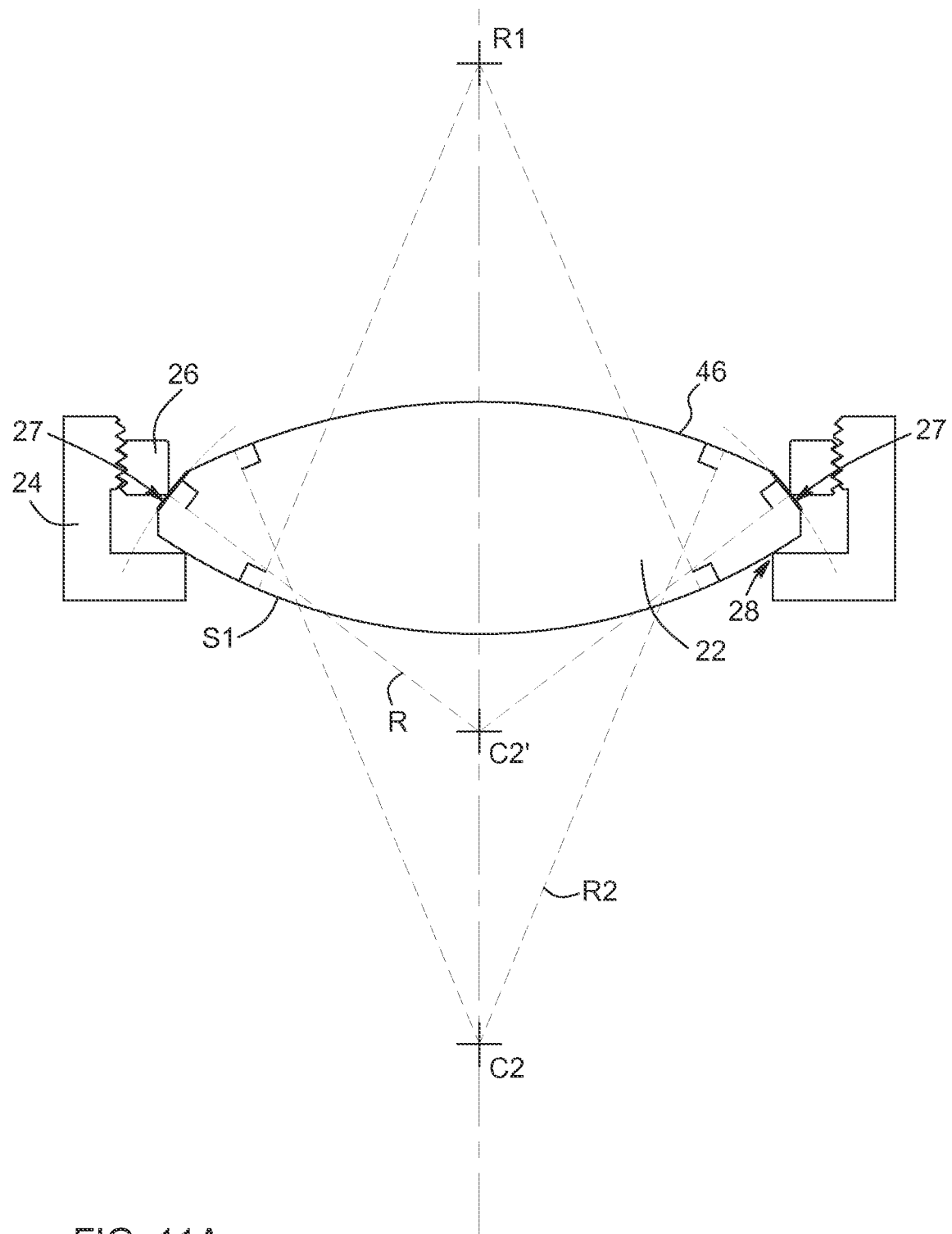
FIGS. 11A to 11D are schematic illustrations of embodiments of optical assemblies where the second surface is convex with central and peripheral regions having different profiles, and the first surface is respectively convex (FIGS. 11A and 11D), concave (FIG. 11B) and planar (FIG. 11C).

In the example of FIG. 11A, the optical element is biconvex and the central region 46 of the second surface S2 defines a spherical segment of constant radius of curvature R2 which defines a center of curvature C2, the radius of curvature being selected, for example, in view of the desired focal length of the optical element 22. The radius of curvature R2, however, does not provide the auto-centering condition explained above for the selected value of the thread angle. In accordance with one optional aspect of the invention, the peripheral region 27 of the second surface may be machined or otherwise shaped so that it defines an annular segment of a sphere having a center of curvature C2' and a radius of curvature R different from R2 and corresponding to, using the model of equation (6):

$$R = \sqrt{\left[\frac{d_{ring}}{2\tan(\varphi_{threads}/2)}\right]^2 + Y^2} \quad (10)$$

or, using the model of equation (7):

$$R = \sqrt{\left[\frac{d_{ring}}{2\tan(\varphi_{threads}/2)} - h - T/2\right]^2 + Y^2} \quad (11)$$

where, as explained above:
- $d_{ring}$ is a diameter of the retaining ring along the ring threads;
- R is the value of the radius of curvature of the second surface along the peripheral region thereof;
- $\phi_{threads}$ is a value of the thread angle of the barrel threads;
- Y is the half-diameter of the abutment of the retaining ring;
- h is the distance between (i) a first point of contact of the barrel threads with the ring threads proximate to the optical element and (ii) a point of contact of the abutment of the retaining ring with the peripheral region of the second surface; and
- T is the distance between (i) the first point of contact of the barrel threads with to the ring threads proximate to the optical element and (ii) a last point of contact of the barrel threads with the ring threads farthest from the optical element diametrically opposite to the first point of contact.

It will be noted that the positive solution to the square-root of equations (10) or (11) has been retained in view of the convex nature of the illustrated peripheral region of the second surface as illustrated in FIG. 11A. Preferably, the radial extent of the peripheral region having a radius of curvature R is wide enough to cover the entire engagement thereof with the abutment of the retaining ring, and narrow enough so as not to impact on the optical properties of the optical element 22. It will be noted by one skilled in the art that the curvature of the peripheral region 27 in the illustrated example of FIG. 11A and of other figures may appear flat to the eye, but that this appearance is an artefact of the representation of a curved segment of length much smaller than its radius of curvature R.

Figure 11B:
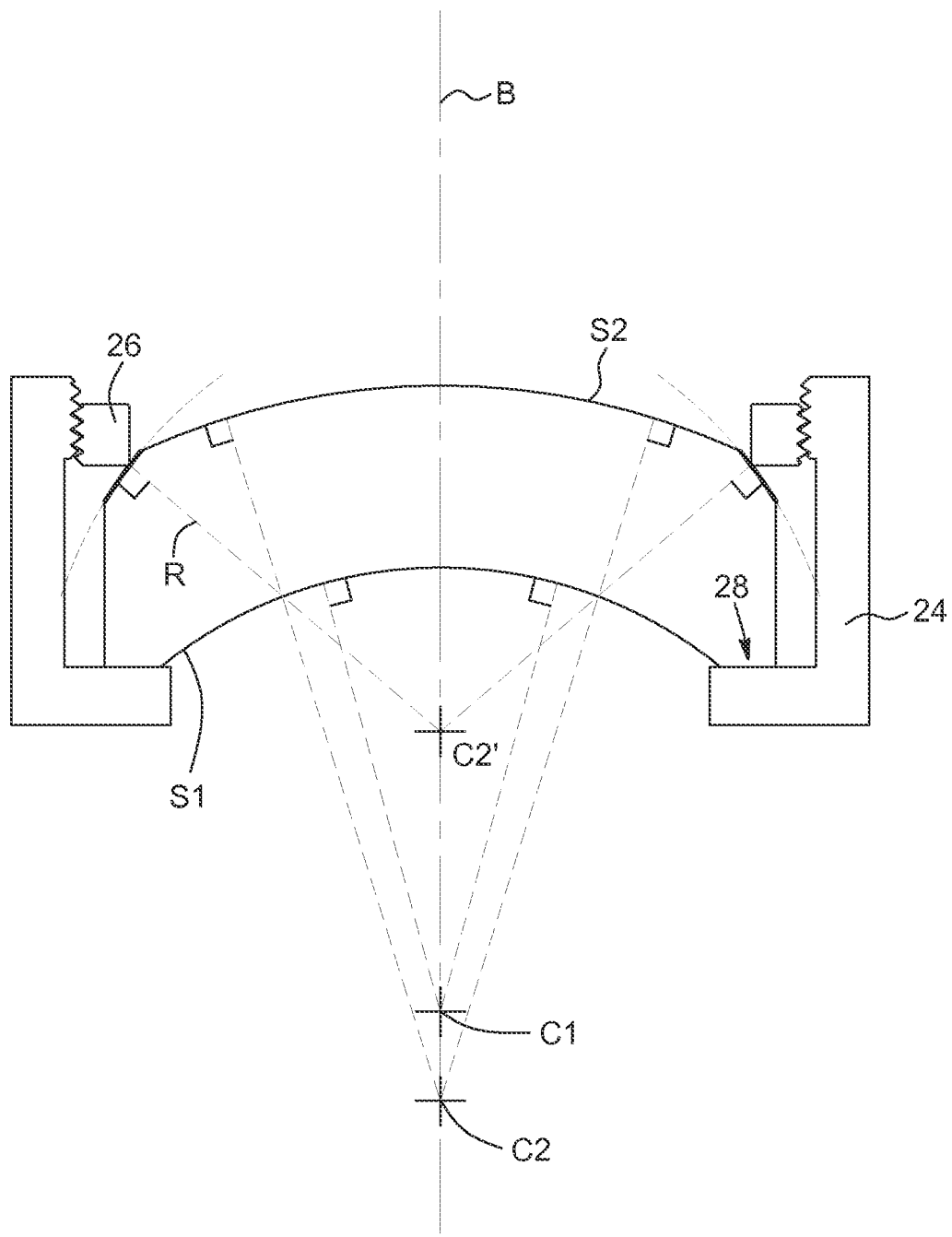
Figure 11C:
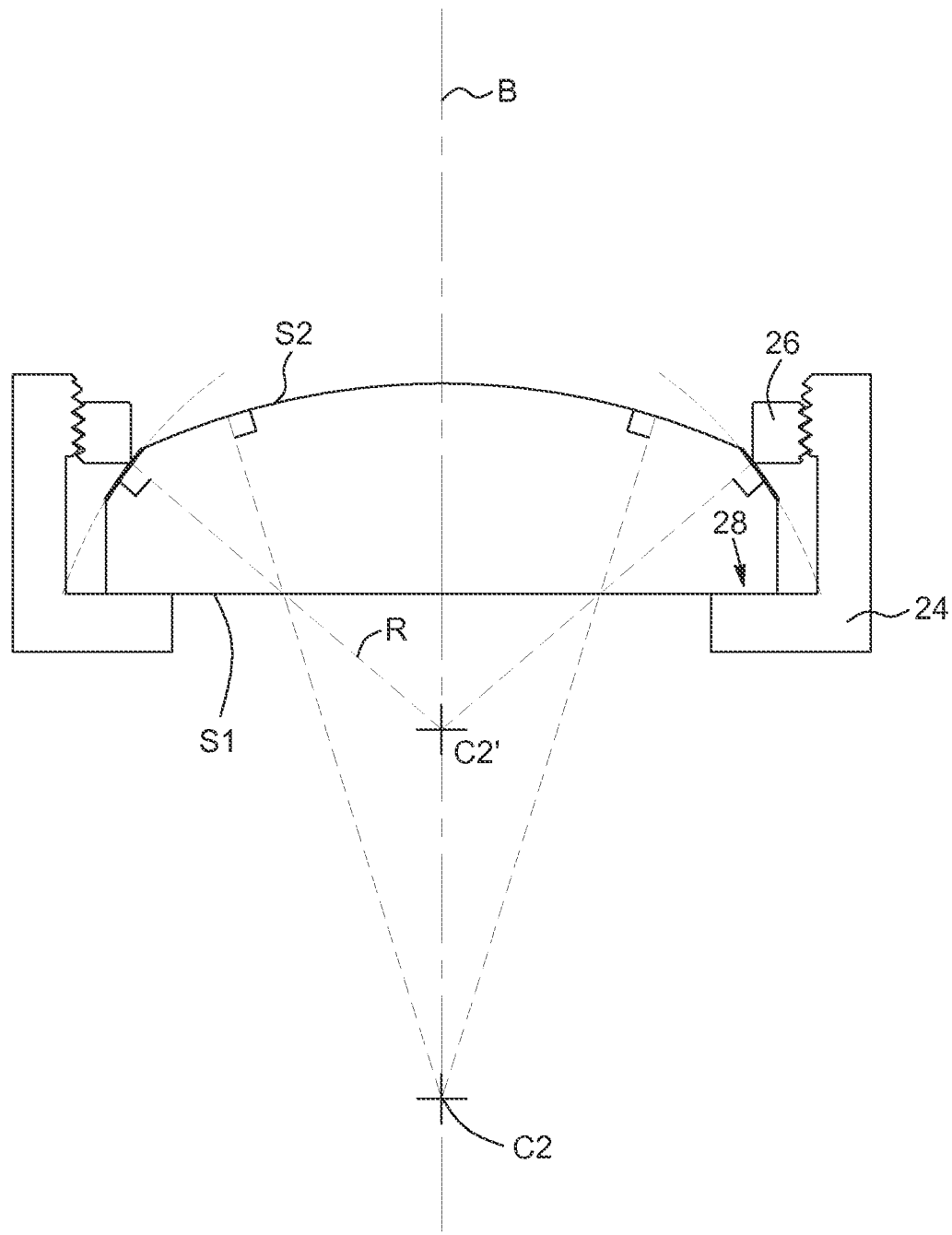
Figure 11D:
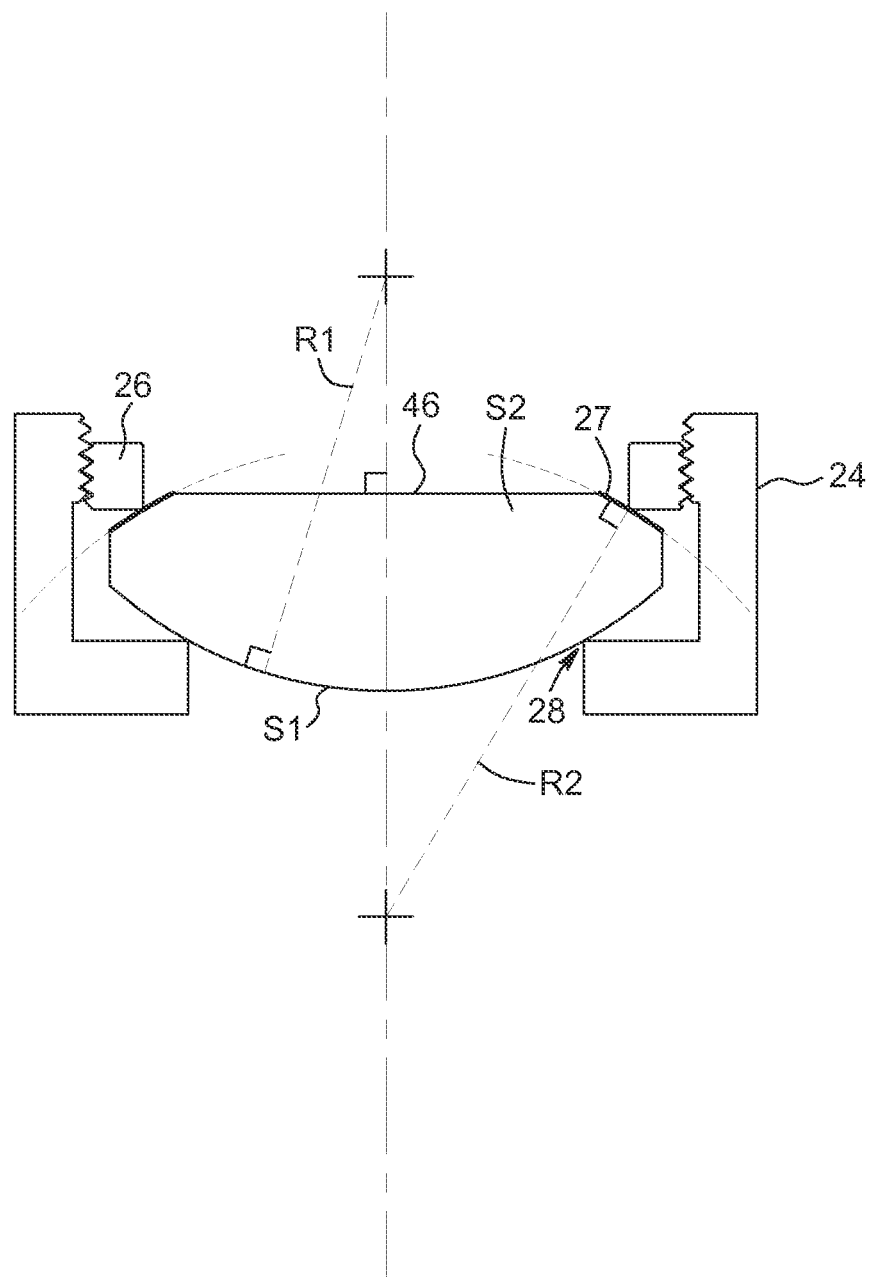

FIG. 11B shows an embodiment similar to that of FIG. 11A, where the first surface S1 is concave instead of convex, and the first surface has a planar portion therearound engaging the seat 28. FIG. 11O shows another similar variant where the entire first surface is planar. In other, non-illustrated embodiments, the shape of the region of the first surface in contact with the abutment may differ from that of the center region without departing from the scope of the invention. FIG. 11D shows another variant where the central region 46 of the second surface S2 is planar. Indeed, only the peripheral region 27 of the second surface S2 needs to meet the auto-centering condition, such that the present embodiment can be applied to various profiles for the central region 46 of the second surface.

Figure 12A:
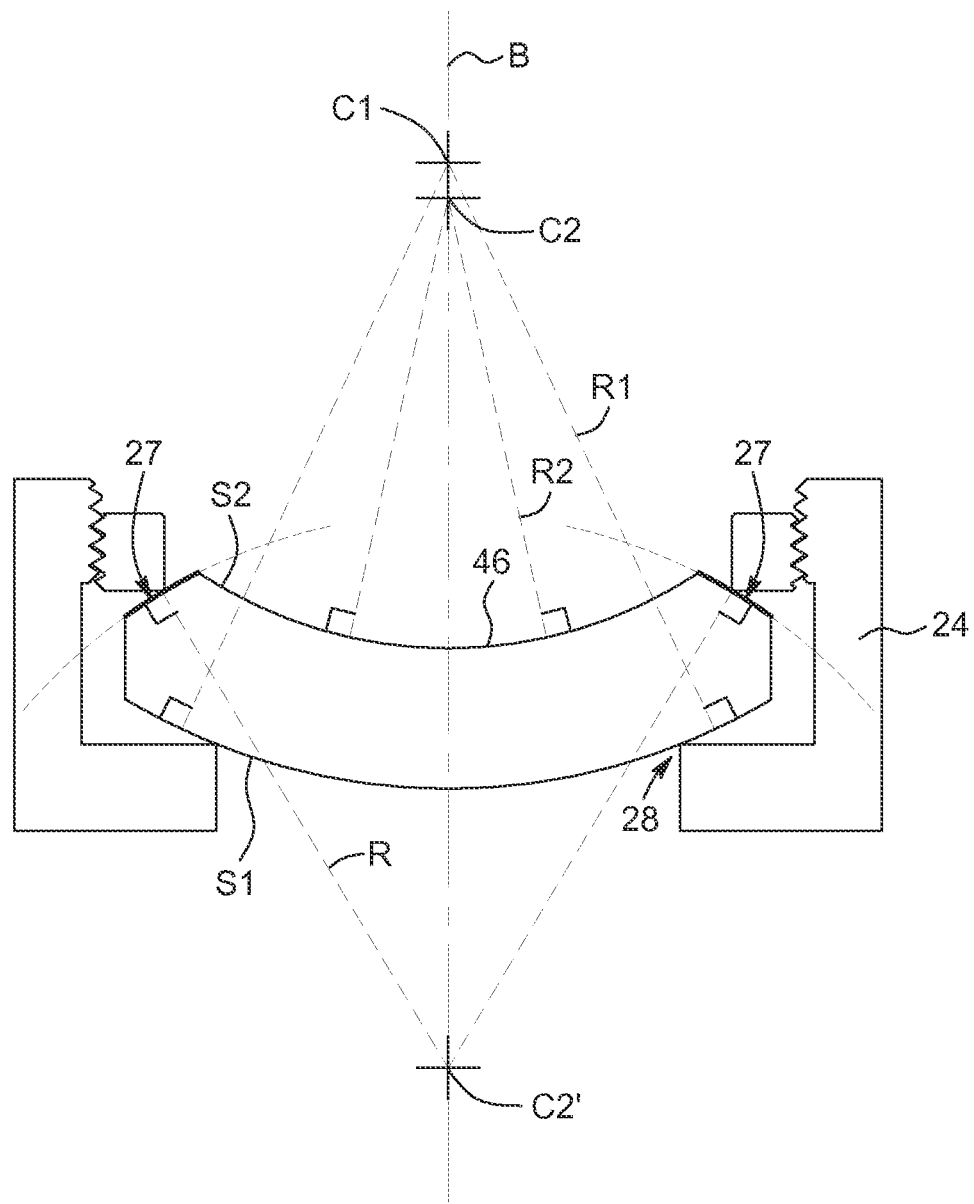
FIGS. 12A to 12C are schematic illustrations of embodiments of optical assemblies where the second surface of the optical element has a concave profile and the first surface is respectively convex (FIG. 12A), concave (FIG. 12B) and planar (FIG. 12C).
Figure 12B:
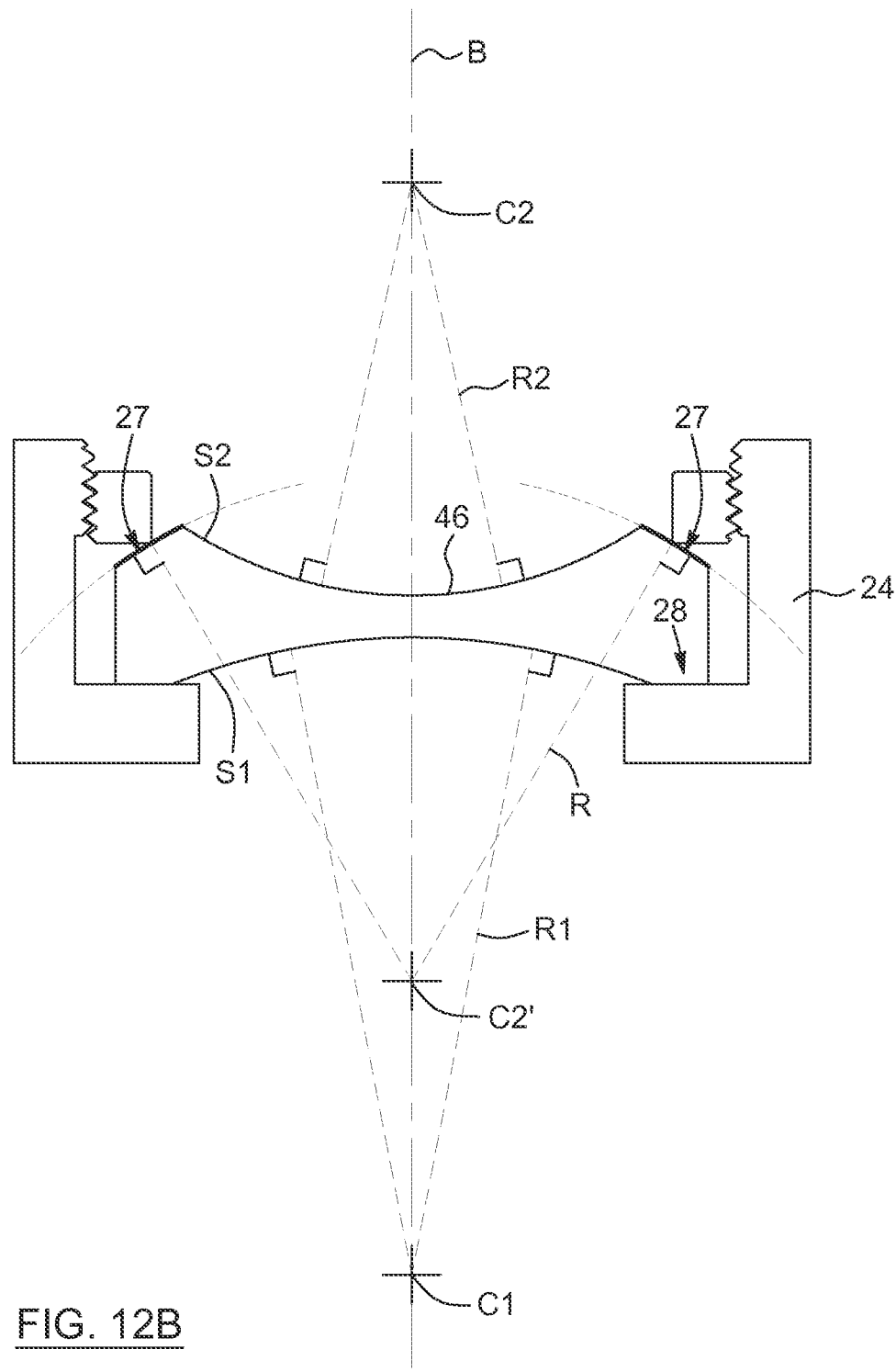
Figure 12C:
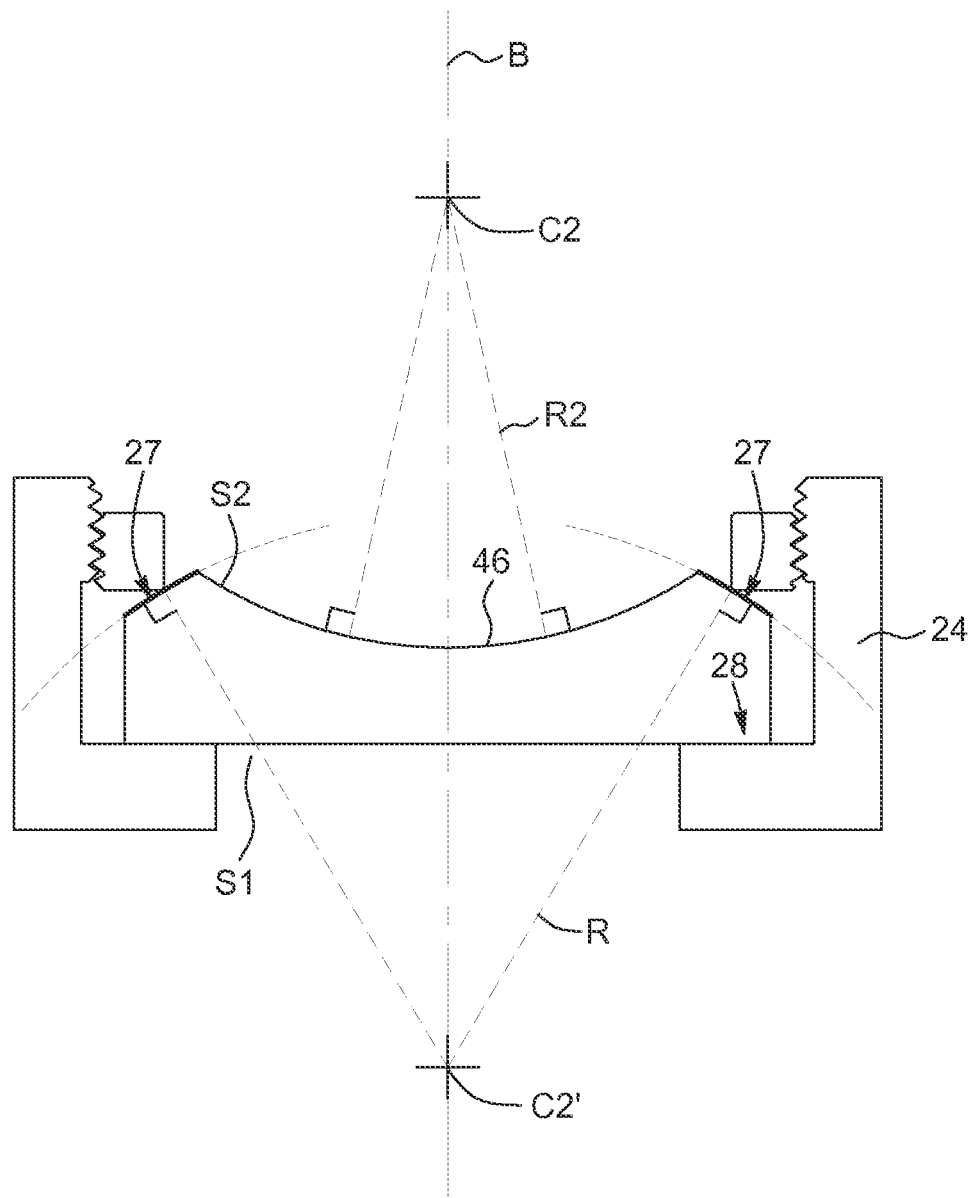

Referring to FIGS. 12A to 12C, variants of the invention where the second surface of the optical element has a concave profile in the central region thereof 46 are shown. The first surface S1 is respectively shown as convex (FIG. 12A), concave with a planar peripheral portion therearound engaging the seat 28 (FIG. 12B), or planar (FIG. 12C). Again, in other, non-illustrated embodiments, the shape of the region of the first surface in contact with the abutment may differ from that of the center region without departing from the scope of the invention. As with the embodiments of FIGS. 11A to 11D, the central region 46 of the second surface S2 of the optical element 22 has a spatial profile predetermined according to target optical properties of the optical element, in this case a concave profile having a center of curvature C2 located on the side of the second surface S2. The spatial profile of the peripheral region 27 of the second surface, however, differs from the spatial profile of the central region 46, and defines for example a convex annular segment of a sphere of radius of curvature R and center of curvature C2'. In this manner, the radius of curvature R of the peripheral region 27 can be adapted to the auto-centering condition of equations (10) or (11), without any impact on the optical properties of the optical element 22.

It will be readily understood that although most of the variants described herein involve adjusting either the thread angle or the radius of curvature of the peripheral region of the second surface, other embodiments may combine variants in both categories by providing both an adjustment of the thread angle and an adjustment of the radius of curvature of the peripheral region of the second surface, so that both parameters collectively contribute to the auto-centering condition. Numerous combinations of similar nature can be envisioned by one skilled in the art.

Second Surface Having a Concave Shape

Figure 13B:
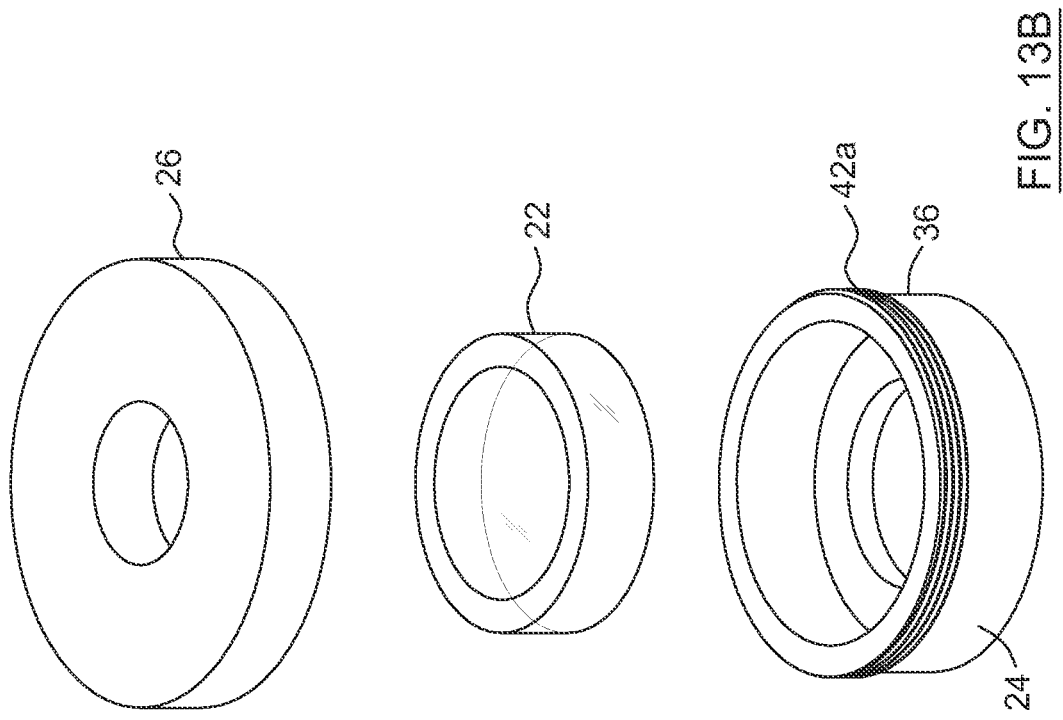
FIG. 13B is an exploded view of the optical assembly of FIG. 13A.
Figure 13A:
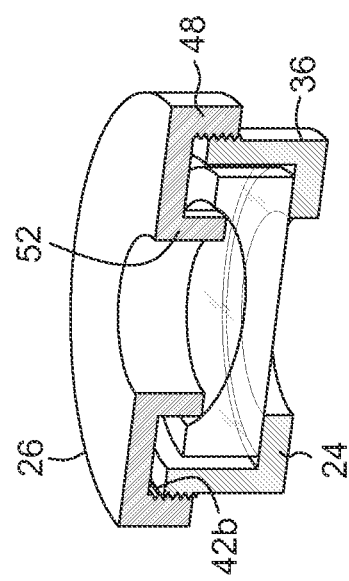
FIG. 13A is a cross-sectional perspective view of an optical assembly according to the embodiment of FIG. 13.

Referring to FIGS. 13, 13A and 13B, there is shown another embodiment of the invention where the second surface S2 has a concave shape which extends to the peripheral region 27 in contact with the abutment 44 of the retaining ring 26. In this configuration, if a standard retaining ring was to be threaded inside the cavity to abut on the concave peripheral region 27 of the optical element 22, then the contributions of the decentering and tilt of the retaining ring with respect to the center axis would both act to decenter the lens along the same direction, and therefore the counterbalancing effect leading to the auto-centering condition would not be enabled. Various adjustments may however be made to the design of the assembly so that the decentering and tilt of the retaining ring act to decenter the optical element along opposite directions, therefore allowing for the auto-centering condition to be met.

In one example, a retaining ring 26 having ring threads facing inwardly and engaging barrel threads facing outwardly may be used to circumvent this difficulty. In the illustrated example of FIGS. 13, 13A and 13B, the retaining ring 26 includes an outer annular segment 48 provided with the inwardly-facing ring threads 42b, the outer annular segment extending outside of the barrel 24. The ring threads 42b are therefore provided on a barrel-facing wall 50 of the outer annular segment 48. The barrel threads 42a are on the outer wall 36 of the barrel 24. The retaining ring 26 further includes an inner annular segment 52, extending inside of the cavity 32, and including the abutment 44. As can be seen, in the illustrated embodiment the abutment 44 is simply defined by an edge of the inner annular segment 52. Optionally, the edge of the inner annular segment defining the abutment 44 may be bevelled or rounded so as to avoid damaging the second surface S2 of the optical element 22.

Figure 14A:
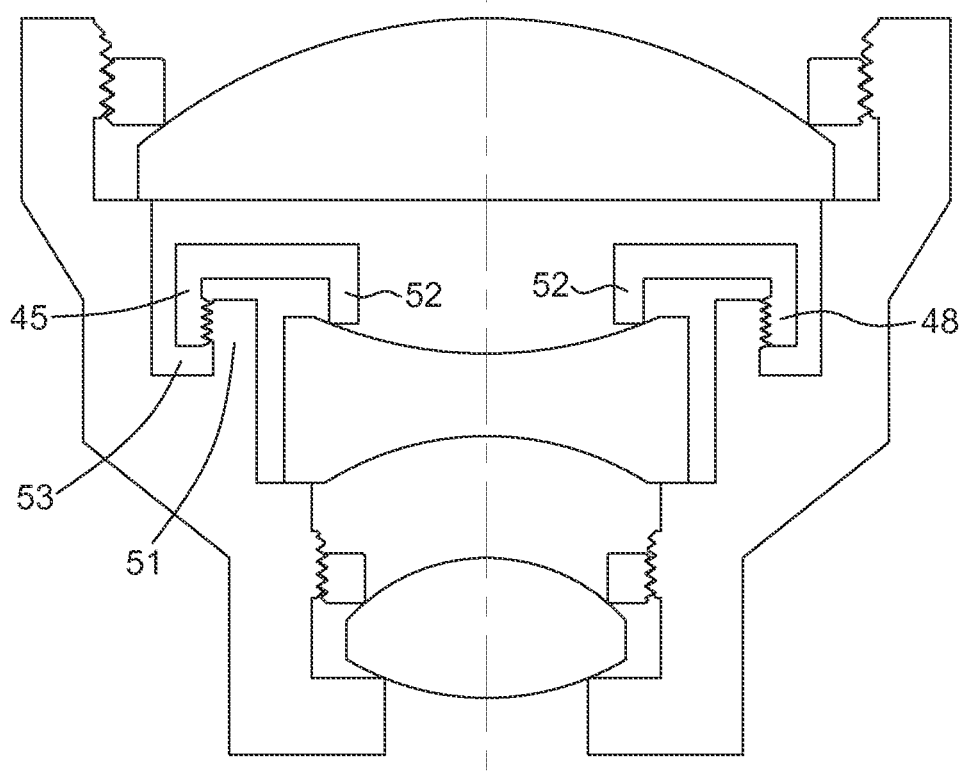
FIGS. 14A and 14B are schematic illustrations of embodiments of optical assemblies adapted for mounting optical elements having a concave second surface.

It will be noted that the configuration shown in FIG. 13 would be appropriate as a single auto-centering arrangement or as the topmost one of a series of auto-centering optical arrangements, as it would prevent the subsequent mounting of an optical element in the same barrel 24. In another variant, shown in FIG. 14A, the cavity 32 of the barrel 24 may include an inner projection 51 defining a gap 53 in which the outer annular segment 52 of the retaining ring 26 can be inserted. This configuration allows the barrel threads 42a and ring threads 42b to face outward and inward, respectively, providing the auto-centering condition while still allowing other optical elements to be subsequently mounted in the cavity.

Figure 14B:
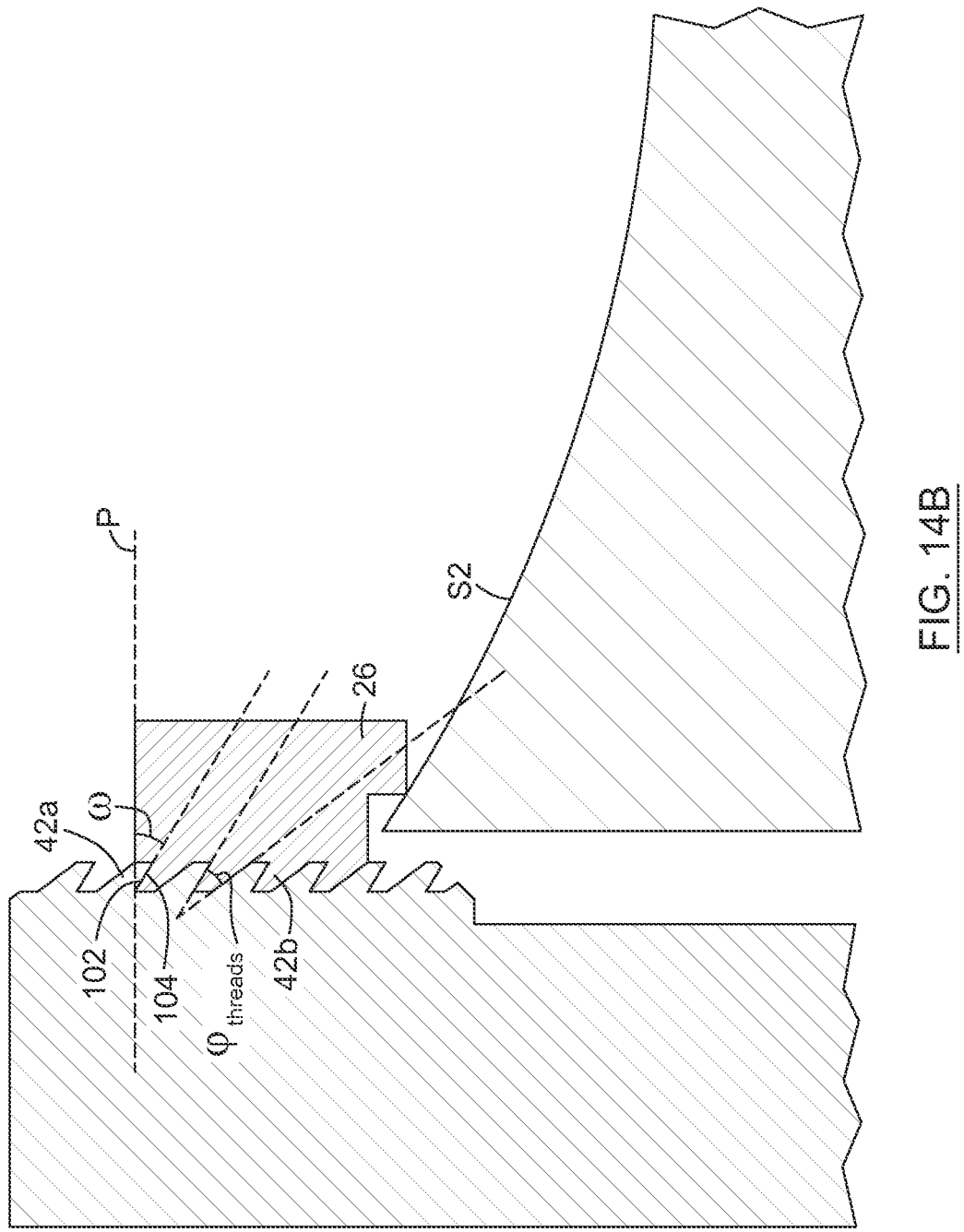

According to another approach, the effective thread angle of the barrel and ring threads may have a negative value, as illustrated for example in FIG. 14B. A "negative" thread angle is understood to refer to a barrel thread 42a pointing toward the bottom of the assembly, so that both surfaces of a barrel thread 42a are angled in nearly the same direction, in a downward slope inwardly of the cavity. Of course, the complementary ring threads therefore have an opposite upward slope outwardly of the cavity. As shown in FIG. 14B, in this case the bottom surface 102 of the barrel threads 42a and the top surface 104 of the ring threads 42b extend downwardly with respect to the plane P perpendicular to the center axis of the cavity, hence the reference to a negative angle.

As the thread profile of such an embodiment is asymmetrical with respect to the plane P perpendicular to the center axis of the cavity, the formalism presented above with respect to equations (6') and (7') may be applied, using the effective thread angle ω as a parameter, instead of $\phi_{threads}$, and changing the sign of the parameters h and T, if applicable.

The impact of a negative effective thread angle on the decentering of the retaining ring 26 may be best understood with reference to equations (2) and (3). From equation (3), it can be deduced that changing the sign of the thread angle $\phi_{threads}$ also changes the sign of the tilt of the retaining ring $\theta_{ring}$. It can be seen from equation (2) that changing the sign of changes, in turn, the sign of the lateral decentering $\Delta_{tilt}$ of the center of curvature of the second surface. The use of a negative thread angle therefore reverses the direction of the decentering resulting from the tilt of the retaining ring 26, therefore allowing the auto-centering condition to be met for a concave second surface S2.

The auto-centering condition for the embodiments of FIGS. 13, 13A, 13B, 14A and 14B may be achieved by either adjusting the thread profile, the spatial profile of the peripheral region of the second surface, or both. For example, the thread angle (or the effective thread angle) of the barrel threads 42a may be selected to meet the condition of equations (8) or (9) or an equivalent formulation for the effective thread angle. The radius of curvature of the second surface may be selected, either along the entire surface of locally along the peripheral region 27, to meet the condition of equations (10) or (11). Furthermore, the first surface of the optical element 22 may have any shape as described with respect to previous embodiments.

Optical Element with Aspherical Surfaces

Figure 15:
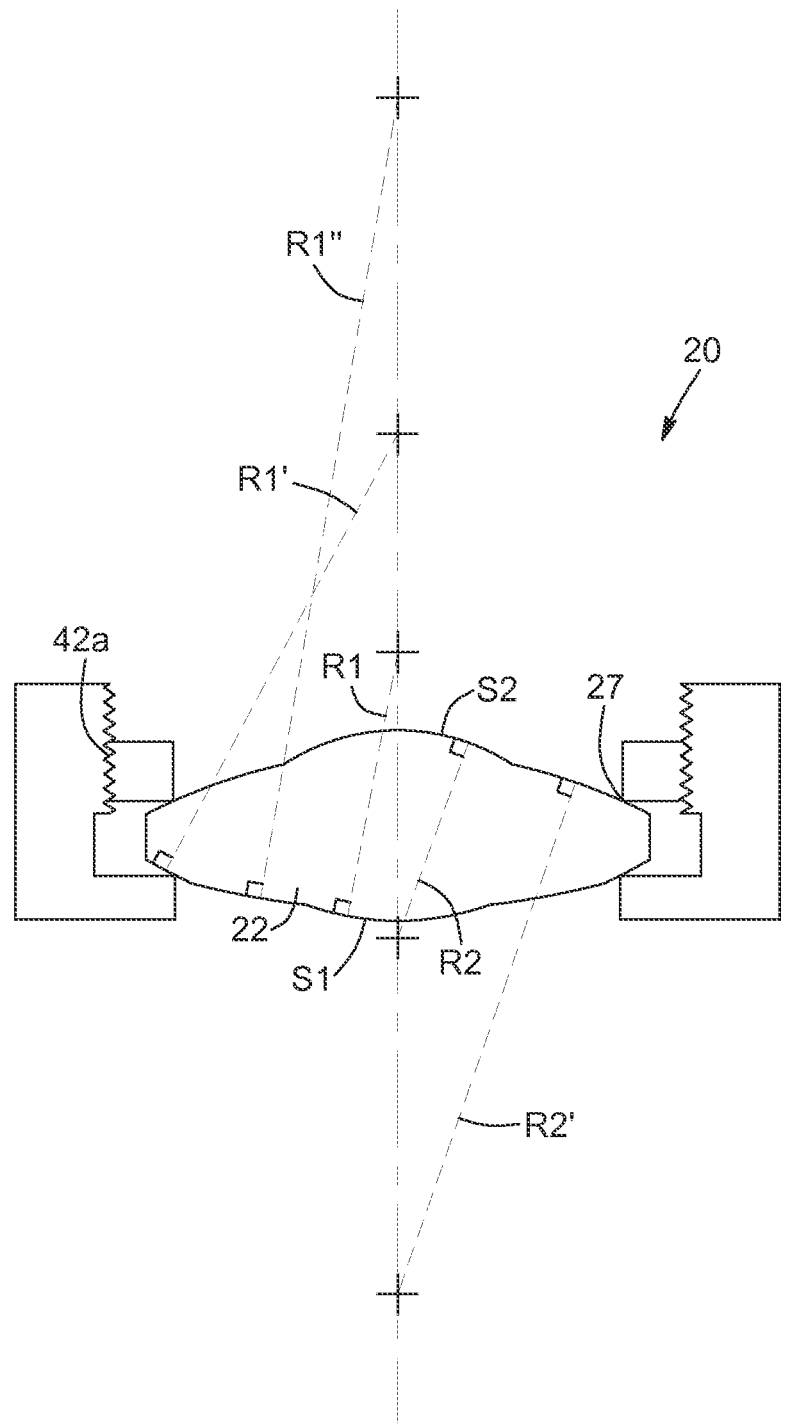
FIG. 15 is a schematic illustration of an embodiment where the optical element has aspherical surfaces.

As mentioned above, embodiments of the present invention are not limited to optical elements having first and second surfaces that are either spherical concave, spherical convex or planar. By way of example, FIG. 15 shows an optical assembly 20 where the optical element 22 is an aspherical lens. In the illustrated example, the second surface S2 of the aspherical lens may be described through different radii of curvature R2 and R2', and the first surface S1 has radii of curvatures R1, R1' and R1" along different sections thereof. It will be understood that the shape could be applied to optical elements other than lenses, and that the exact shape depicted is for illustrative purposes only. A multitude of other shapes can be considered, and in some embodiments, the radius of curvature or either surface can vary continuously from point to point along the surface. For the example of FIG. 15, in some embodiments, the radius of curvature R2' along the peripheral region 27 of the second surface may be selected or adapted in view of the auto-centering condition. Alternatively, the thread angle or profile of the barrel threads 42a may be the parameter adjusted for the auto-centering of the lens. In other variants, both parameters may be adapted in view of the auto-centering condition. As is particularly apparent from this example, the auto-centering condition is independent of the profile of the second surface S2 in regions other than the peripheral region 27, thus making embodiments of the invention applicable to optical elements having a variety of physical aspects.

Sleeve as an Optical Element

Figure 16:
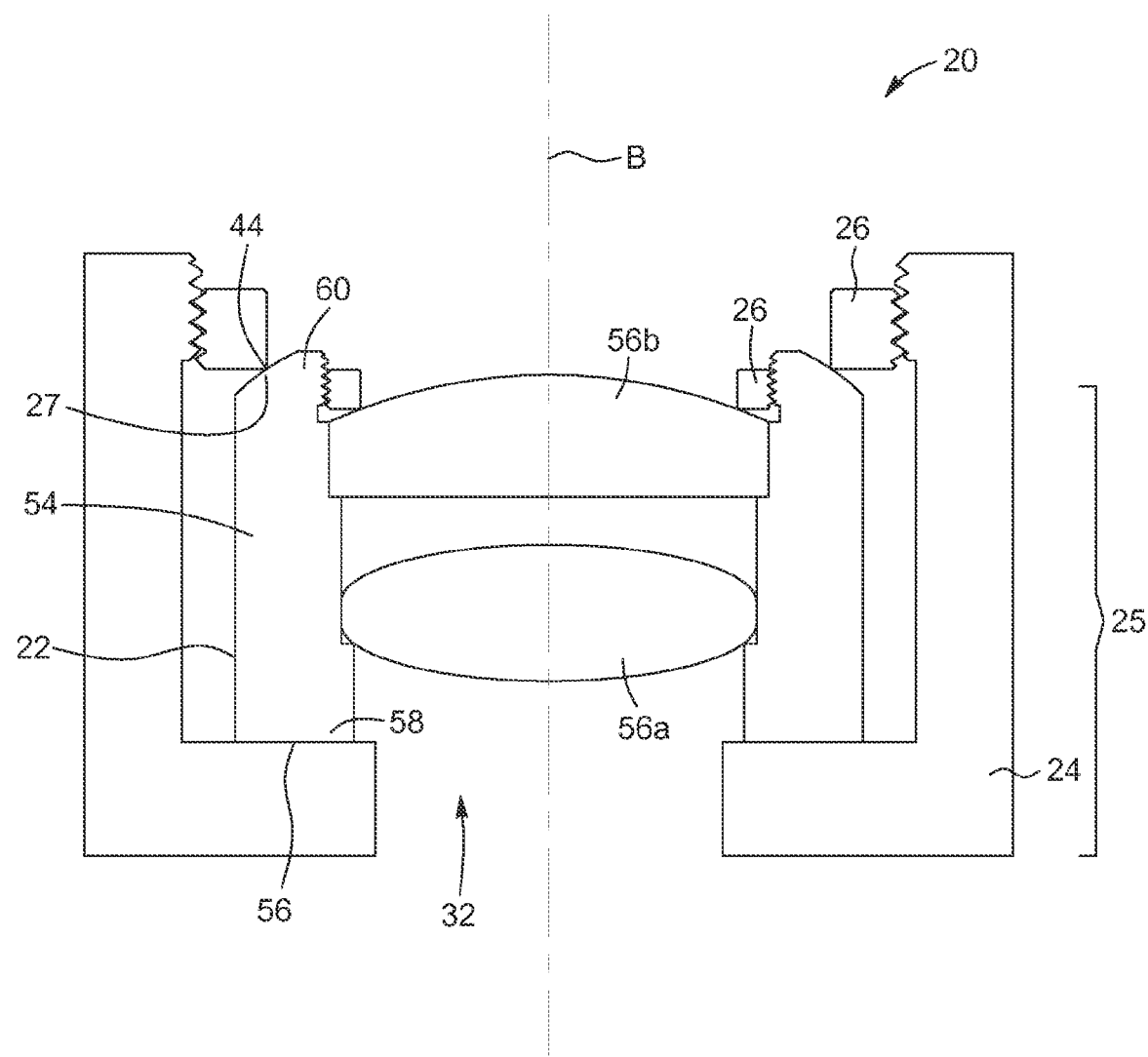
FIG. 16 is a schematic illustration of an embodiment where the optical element includes a sleeve in which one or more optical components are mounted.

Referring to FIG. 16, in some variants, the optical element 22 may be embodied by a sleeve 54 in which one or more optical components 56a, 56b are mounted. The sleeve is inserted inside the cavity 32 of the barrel 24 and held therein by a retaining ring 26. The sleeve 54 has opposite ends 58 and 60 defining the first and second surfaces. In the illustrated example, the end 60 of the sleeve 54 extending in the upper portion of the drawing has a curved profile along the peripheral region 27, that is, the region in contact with the abutment 44 of the retaining ring, this profile thus defining a radius of curvature. This radius of curvature can be adapted to fulfill the auto-centering condition explained above, in view of the thread profile and other parameters of the assembly.

Each optical component 56a, 56b mounted in the sleeve 54 may be embodied by a lens, mirror, diffractive optical element, pinhole or the like. Each optical component 56a, 56b is centered with respect to the sleeve 54, so that the auto-centering of the sleeve 54 will in turn center the optical components 56a, 56b therein with respect to the center axis B of the cavity 32. In the illustrated embodiment, one of the optical components 56b is auto-centered within the sleeve 54, using a threaded retaining ring 26 in accordance with the principle explained above. The other optical component 56a is centered according to a different technique, for example an active alignment followed by bonding of the optical component. In other assemblies, the optical components 56 may be mounted in the sleeve 54 using the common "drop-in" approach, and may be held in place using a threaded ring, a snap ring, a flexure, an elastomeric retainer, a burnished edge or any other suitable means. It will be readily understood that in different variants the number of optical components may vary and that each optical component may or may not be auto-centered within the sleeve. It will further be understood that although the illustrated example of FIG. 16 shows an optical assembly 20 having a single auto-centering arrangement 25 in which the optical element 22 is embodied by a sub-assembly including the sleeve 54 in which optical components 56a, 56b are mounted, in different variants the optical assembly 20 may include a plurality of auto-centering optical arrangements 25, one or more of them including a sleeve and optical components as above, the sleeve having any number of optical components mounted therein.

Assemblies with Multiple Auto-Centering Optical Arrangements

Figure 17:
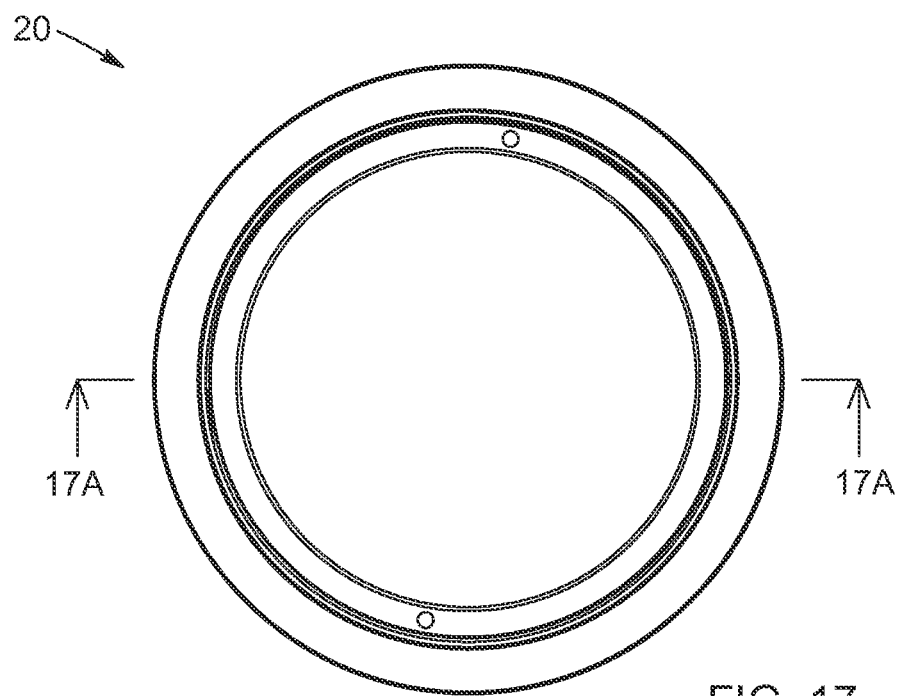
FIG. 17 is a schematized top view of an optical assembly according to one embodiment including a plurality of auto-centered optical arrangements.
Figure 17A:
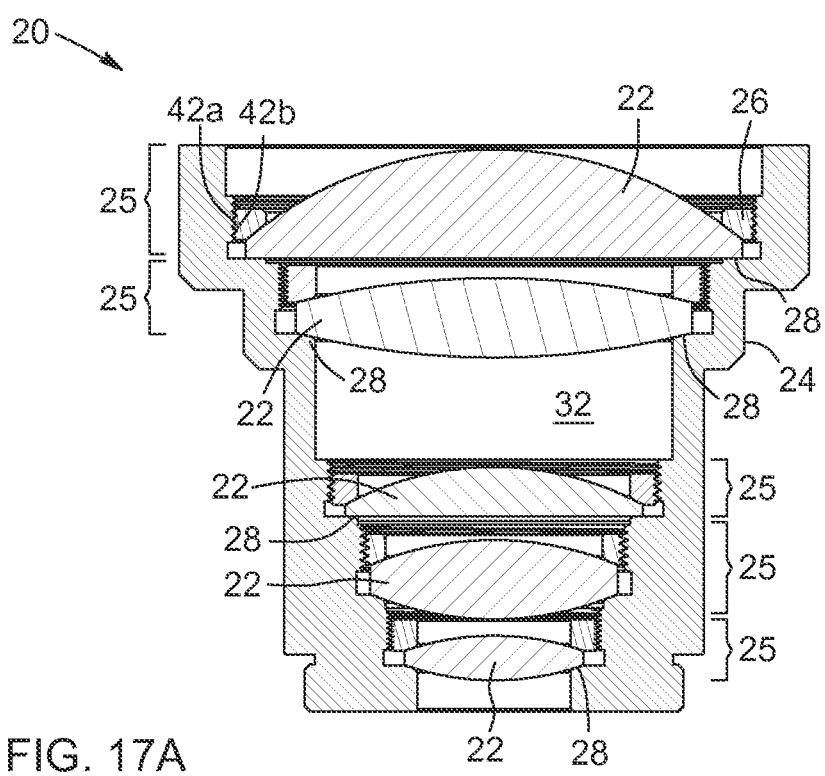
FIG. 17A is a cross-sectional view taken along line AA of FIG. 17.
Figure 18:
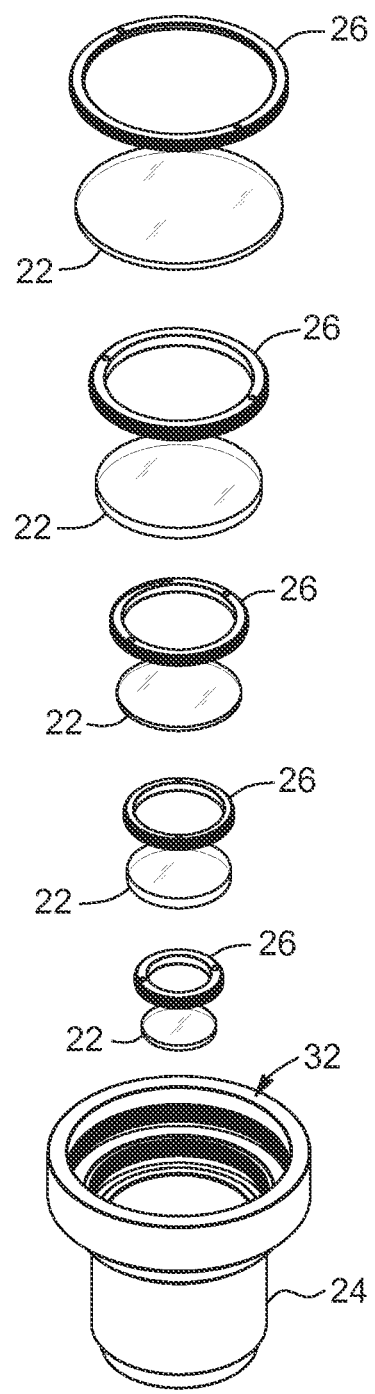
FIG. 18 is an exploded view of the optical assembly of FIG. 17.

Referring to FIGS. 17, 17A and 18, there is shown an optical assembly 20 according to an embodiment of the invention including a plurality of auto-centering optical arrangements 25 cascaded within the cavity 32 of a barrel 24. Each optical arrangement 25 includes an optical element 22 mounted in the cavity 32 and having opposite first and second surfaces. The cavity includes a plurality of seats 28, each associated with one of the optical arrangements 25 and engaging the first surface S1 of the corresponding optical element 22. The various seats can be, for instance, machined in the inner wall of the barrel 24, thus being integral parts thereof. The cavity further includes a plurality of sets of barrel threads 42a, each set being associated with one of the optical arrangements 25. Each auto-centering arrangement 25 includes a retaining ring 26 affixed to the barrel 24 through the set of ring threads 42b complementary to the corresponding barrel threads 42a. In each illustrated auto-centering arrangement 25 of this embodiment the retaining ring 26 is threaded inside the cavity 32, but it will be understood that in a variant the retaining ring 26 of the topmost optical arrangement 25 could be threaded outside of the barrel 24, as shown in FIG. 13. In each optical arrangement 25 the retaining ring 26 has an abutment 44 engaging a peripheral region 27 of the second surface S2 of the optical element 22, so that the optical element 22 is secured between the seat and the retaining ring.

As explained above, for each auto-centering optical arrangement 25, the thread profile of the barrel threads and the spatial profile of the peripheral region of the second surface are such that any decentering of the retaining ring and a corresponding tilt of the retaining ring with respect to the center axis have mutually counterbalancing effects on a centering of the optical element with respect to the center axis, thereby auto-centering the optical element 22.

It will be readily understood that, although all the optical elements mounted in the cavity 32 of the barrel shown in FIGS. 17, 17A and 18 are parts of an auto-centering optical arrangement 25, in other variants one or more components in a same barrel may be mounted according to a different technique. Stated otherwise, auto-centering arrangements 25 and arrangements in which the optical elements are centered using standard techniques can be mixed within a same barrel, according to the various constraints faced in the design and/or manufacture of the resulting optical assembly.

It will be further understood that the various embodiments of auto-centering arrangements described herein may be incorporated within an optical assembly having multiple optical arrangements and may be combined therein in a multitude of fashions.

Extension to Different Thread Profiles and Spatial Profiles of the Second Surface The embodiments described in the previous sections rely on the fact that the thread profile is triangular, trapezoidal or has another profile defined by straight surfaces on individual barrel threads, and is therefore entirely characterised by the thread angle $\phi_{threads}$ or the effective thread angle $\omega$. One skilled in the art will however realize that the auto-centering condition explained herein can also be applied to cases where the barrel threads have a more complex profile.

Figure 19:
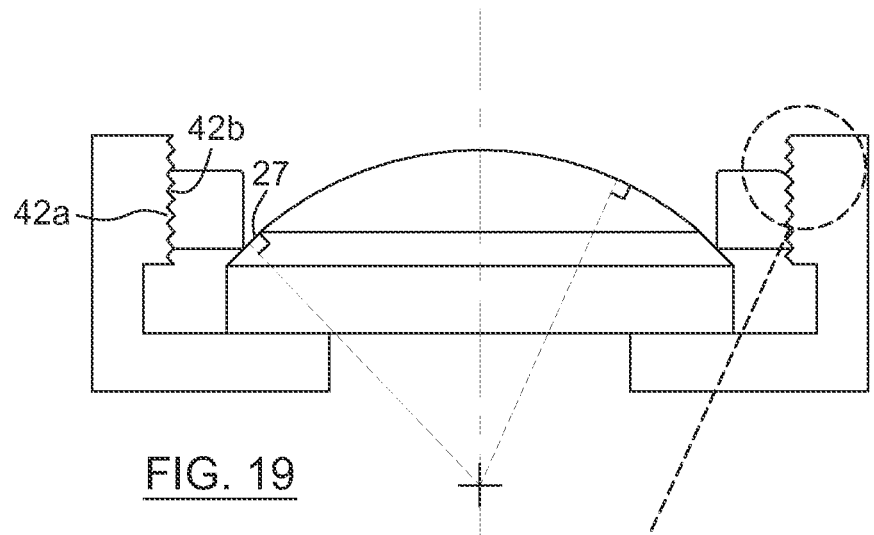
FIG. 19 is a schematic side view of an optical assembly including an optical element where the spatial profile of the second surface in the peripheral region is non-spherical.
Figure 19A:
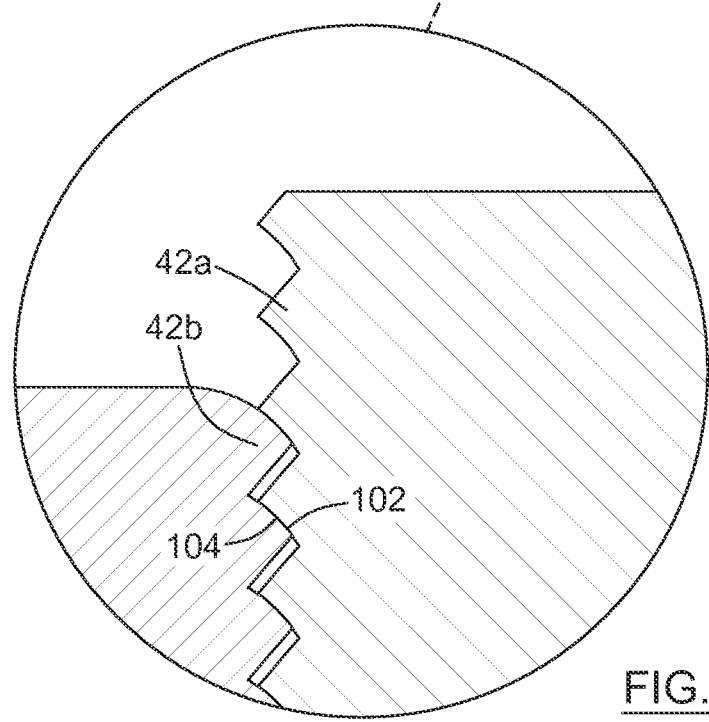
FIG. 19A is an enlarged view of a portion of FIG. 19 showing the engagement of curve shaped thread profiles.

Referring to FIGS. 19 and 19A to 19D, in some embodiments, the thread profile of the complementary threads may have a curved shape. In the example of FIGS. 19 and 19A, the bottom surface 102 of the barrel threads 42a has a rounded shape, and the ring threads 42b have a substantially matching rounded top surface 104. It will be readily understood that in other embodiments, the top surface 104 of the ring threads 42b may have a shape that is not a mirror image of the shape of the bottom surface 102 of the barrel threads 42a, as long as the overall geometry of the threads is sufficiently complementary to allow a threading engagement therebetween.

Figure 19B:
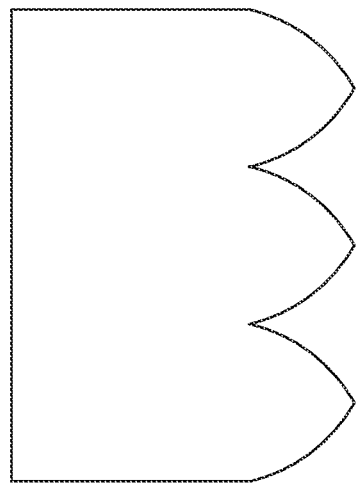
FIGS. 19B to 19D show various non-linear thread profiles.
Figure 19C:
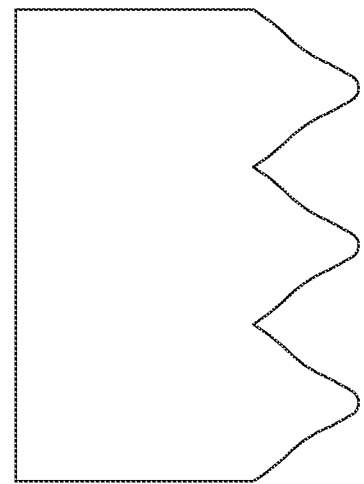
Figure 19D:
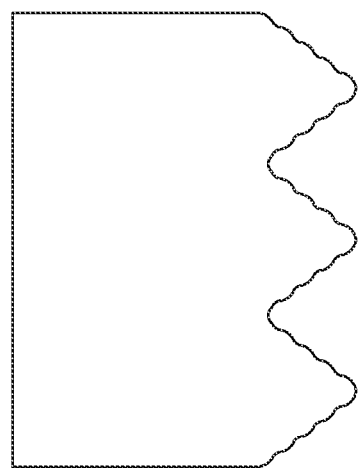
Figure 19E:
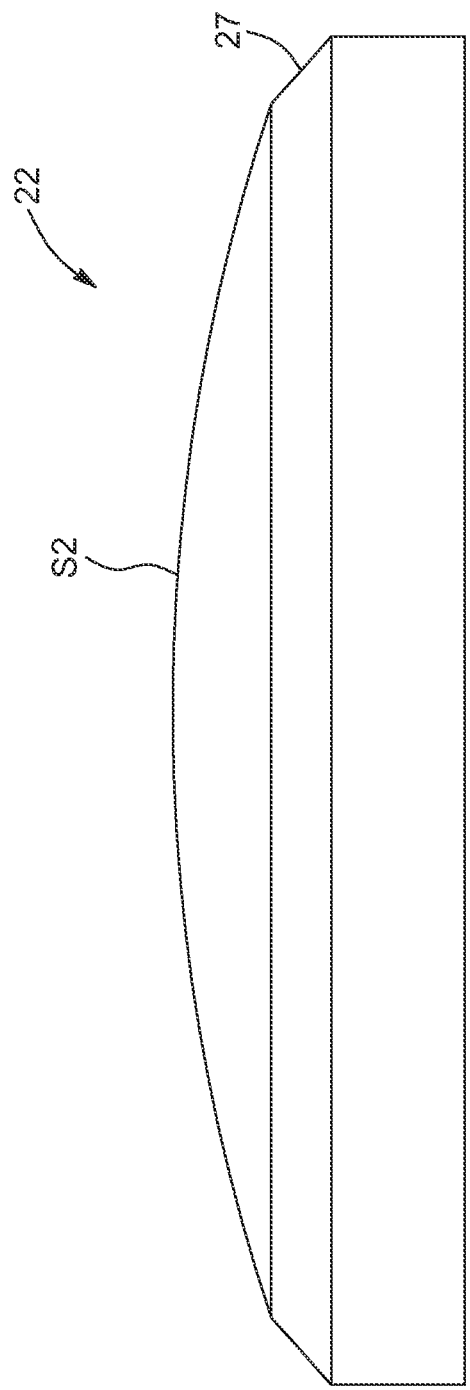
FIG. 19E is a side view of the optical element of FIG. 19.

FIG. 19 also illustrates that in some variants, the spatial profile of the second surface S2 in the peripheral region 27 may be other than spherical, and therefore not entirely defined by a constant value of the radius of curvature. In the illustrated example the peripheral region of the second surface is conical, that is, it defines a circular section of a cone. FIG. 19E allows a better three-dimensional visualization of the shape of the optical element in this context. It will therefore be readily understood that a constant radius or curvature cannot be used to define this surface.

Figure 20:
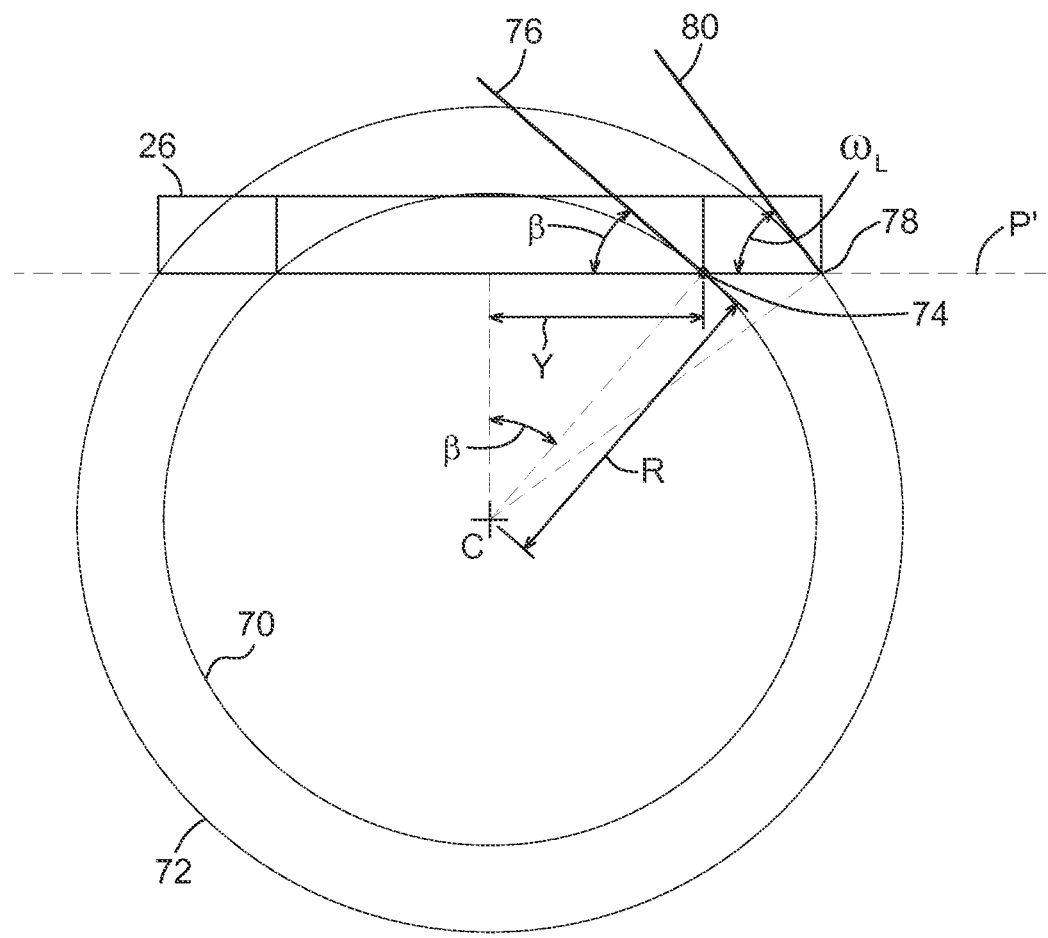
FIG. 20 is a conceptual drawing illustrating parameters to consider in the generalization of the auto-centering condition in accordance with one embodiment.

The generalization of the auto-centering condition to such cases can be better understood with reference to the diagram of FIG. 20, showing the retaining ring 26 at a position that is assumed to meet the auto-centering condition. In this diagram, a ring-optical element point of contact 74 is represented as an intersection of an inner corner of the retaining ring 26 and a first circle 70 having a radius of curvature R corresponding to the instantaneous radius of curvature of the second surface of the optical element at this ring-optical element point of contact 74. A local equivalent ring-optical element angle β between a tangent line 76 to the first circle 70 at the point of contact 74 and the plane of the retaining ring 26 can be written as $$\beta = \sin^{-1}\left(\frac{Y}{R}\right), \quad (12)$$

where R is the local radius of curvature of the second surface of the optical element at the ring-optical element point of contact 74 and Y is the half-diameter of the abutment of the retaining ring (i.e. the length of a line segment joining the ring-optical element point of contact 74 and the symmetry axis of the retaining ring).

Similarly, a ring-barrel point of contact 78 is represented on FIG. 20 as an intersection of an outer corner of the retaining ring 26 and a second circle 72. The second circle 72 is concentric to the first circle 70 and has a radius corresponding to the line joining the joint center of curvature C to the ring-barrel point of contact 78. A tangent line 80 to the second circle 72 can be considered as the average orientation of the bottom surface of the barrel threads when the auto-centering condition is met. In other words, the bottom surface of the barrel threads can have a non-linear profile, inasmuch as an average tangent to each point thereof is substantially parallel to the tangent line 80.

Of course, one skilled in the art will readily understand that these considerations may decrease the precision of the auto-centering of the optical element, and that the greater the deviation of the bottom surface of the barrel threads from the tangent line 80, the greater this imprecision will be. The remaining degree of precision on the auto-centering of the optical element may however be acceptable for many applications. FIGS. 19B to 19D show various examples of non-triangular thread profiles that could meet this condition.

Referring back to FIG. 20, the thread profile of the barrel threads can be expressed as a local effective thread angle $\omega_L$, corresponding to the angle between the tangent line 80 to the second circle and a plane P' corresponding to the plane of the bottom surface of the retaining ring. Of course, in cases where the top surface of the barrel threads is planar and the barrel threads are symmetrical, the local effective thread angle $\omega_L$ simply corresponds to half of the thread angle, $\phi_{threads}/2$.

In view of these considerations, the model of equation (7) can be adapted to substitute the local effective thread angle $\omega_L$ for $\phi_{threads}/2$, as was done to obtain equation (7'), and express the radius of curvature R as a function of the local equivalent ring-optical element angle β, leading to the following generalized version of the auto-centering condition:

$$\frac{d_{ring}}{2\tan(\omega_L)} = \sqrt{\left(\frac{Y}{\sin(\beta)}\right)^2 - Y^2} + h + T/2 \quad (13)$$

It will be readily understood that parameters $\omega_L$ or β can be isolated in equation (13) in embodiments where adjusting either the thread profile of the barrel threads or the spatial profile of the peripheral region of the second surface is contemplated to meet the auto-centering condition. It will be further understood that the generalized auto-centering condition expressed at equation (13) allows for both the thread profile of the barrel threads or the spatial profile of the peripheral region of the second surface to have complex shapes. However, in some variants, only one of these parameters could be generalized, the other one of these parameters reducing to the thread angle of the barrel threads or to the radius of curvature of the peripheral region of the second surface, respectively.

Of course, numerous modifications could be made to the embodiments described above without departing from the scope of the invention as defined in the appended claims.

The invention claimed is:

1. A method of mounting an optical element within a barrel, the optical element having opposite first and second surfaces, the second surface comprising a peripheral region, the barrel defining a cavity comprising a seat, said cavity having a center axis; the method comprising the following steps:
   a) providing a retaining ring having an abutment for engaging the peripheral region of the second surface of the optical element;
   b) determining an auto-centering condition whereby any decentering of the retaining ring and a corresponding tilt of the retaining ring with respect to the center axis have counterbalancing effects on a centering of the optical element with respect to the center axis;
   c) selecting a thread profile for a set of barrel threads and a spatial profile for the peripheral region of the second surface in view of said auto-centering condition;
   d) providing the barrel with barrel threads according to the thread profile as selected at step c) and the retaining ring with ring threads complementary to said barrel threads;
   e) if necessary, modifying at least the peripheral region of the second surface according to the selected spatial profile therefor;
   f) positioning the optical element in the cavity with the first surface abutting on the seat; and
   g) threading the retaining ring with the barrel until the abutment of the retaining ring engages the second surface of the optical element, thereby securing the optical element between the seat and said retaining ring.

2. The method according to claim 1, wherein the optical element is a lens, a mirror, a diffractive optical element or a pinhole.

3. The method according to claim 1, wherein each of the first surface and the second surface of the optical element is planar, concave or convex.

4. The method according to claim 1, wherein the optical element comprises:

a sleeve having opposite ends defining said first and second surfaces; and one or more optical components mounted in the sleeve and centered with respect thereto.

5. The method according to claim 1, wherein the thread profile of the barrel threads has a triangular shape or a trapezoidal shape.

6. The method according to claim 1, wherein the retaining ring is inserted within the cavity, the barrel threads being provided on an inner wall of the barrel and the ring threads being provided on an outer perimeter of the retaining ring.

7. The method according to claim 1, wherein the retaining ring comprises:

an outer annular segment provided with said ring threads, the ring threads facing inwardly to said cavity and the barrel threads facing outwardly to said cavity;

an inner annular segment extending inside of the cavity and comprising the abutment of the retaining ring.

8. The method according to claim 1, wherein the thread profile is defined by a thread angle of the barrel threads and the spatial profile is defined by a radius of curvature of the second surface along said peripheral region thereof.

9. The method according to claim 8, wherein the auto-centering condition determined at step b) corresponds to:

$$\frac{d_{ring}}{2\tan(\varphi_{threads}/2)} = \sqrt{R^2 - Y^2}$$

where $d_{ring}$ is a diameter of the retaining ring along the ring threads, R is the value of the radius of curvature of the second surface along the peripheral region thereof, $\varphi_{thread}$ is a value of the thread angle of the barrel threads and Y is a half-diameter of the abutment of the retaining ring.

10. The method according to claim 8, wherein the auto-centering condition determined at step b) corresponds to:

$$\frac{d_{ring}}{2\tan(\varphi_{threads}/2)} = \sqrt{R^2 - Y^2} + h + T/2$$

where:

$d_{ring}$ is a diameter of the retaining ring along the ring threads;

R is the value of the radius of curvature of the second surface along the peripheral region thereof;

$\varphi_{threads}$ is a value of the thread angle of the barrel threads;

Y is a haft-diameter of the abutment of the retaining ring;

h is the distance between (i) a first point of contact of the barrel threads with the ring threads proximate to the optical element and (ii) a point of contact of the abutment of the retaining ring with the peripheral region of the second surface; and T is the distance between (i) the first point of contact of the barrel threads with the ring threads proximate to the optical element and (ii) a last point of contact of the barrel threads with the ring threads farthest from the optical element diametrically opposite to the first point of contact.

11. The method according to claim 8, wherein the auto-centering condition corresponds to:

$$\frac{d_{ring}}{2\tan(\omega_L)} = \sqrt{\left(\frac{Y}{\sin(\beta)}\right)^2 - Y^2} + h + T/2$$

where:

$d_{ring}$ is a diameter of the retaining ring along the ring threads;

β is a local equivalent ring-optical element angle;

$\omega_L$ is the local effective thread angle;

Y is a half-diameter of the abutment of the retaining ring;

h is the distance between (i) a first point of contact of the barrel threads with the ring threads proximate to the optical element and (ii) a point of contact of the abutment of the retaining ring with the peripheral region of the second surface; and T is the distance between (i) the first point of contact of the barrel threads with the ring threads proximate to the optical element and (ii) a last point of contact of the barrel threads with the ring threads farthest from the optical element diametrically opposite to the first point of contact.

12. The method according to claim 1, wherein the spatial profile of the peripheral region of the second surface is defined by a radius of curvature of the entire second surface, said radius of curvature being predetermined according to target optical properties of the optical element, the auto-centering condition being determined at step b) in view of said radius of curvature of the second surface.

13. The method according to claim 12, wherein the auto-centering condition determined at step b) comprises computing a thread angle $\varphi_{threads}$ of the barrel threads according to:

$$\varphi_{threads} = 2\tan^{-1}\left(\frac{d_{ring}}{2\sqrt{R^2 - Y^2}}\right)$$

where $d_{ring}$ is a diameter of the retaining ring along the ring threads, R is the value of the radius of curvature of the second surface, and Y is a half-diameter of the abutment of the retaining ring.

14. The method according to claim 12, wherein the auto-centering condition determined at step b) comprises computing a thread angle $\varphi_{threads}$ of the barrel threads according to:

$$\varphi_{threads} = 2\tan^{-1}\left(\frac{d_{ring}}{2\sqrt{R^2 - Y^2} + 2h + T}\right)$$

where:

$d_{ring}$ is a diameter of the retaining ring along the ring threads;

R is the value of the radius of curvature of the second surface along the peripheral region thereof;

Y is a half-diameter of the abutment of the retaining ring;

h is the distance between (i) a first point of contact of the barrel threads with the ring threads proximate to the optical element and (ii) a point of contact of the abutment of the retaining ring with the peripheral region of the second surface; and T is the distance between (i) the first point of contact of the barrel threads with the ring threads proximate to the optical element and (ii) a last point of contact of the barrel threads with the ring threads farthest from the optical element diametrically opposite to the first point of contact.

15. The method according to claim 13, wherein the selecting of step c) comprises selecting a value for the thread angle of the barrel threads that differs from 55 degrees or 60 degrees.

16. The method according to claim 1, wherein the second surface of the optical element comprises a central region having a spatial profile predetermined according to target optical properties of the optical element, the spatial profile of the peripheral region used in determining the auto-centering condition at step b) differing from the spatial profile of the central region.

17. The method according to claim 16, wherein the auto-centering condition determined at step b) comprises computing radius of curvature R corresponding to:

$$R = \sqrt{\left[\frac{d_{ring}}{2\tan(\varphi_{threads}/2)}\right]^2 + Y^2}$$

where $d_{ring}$ is a diameter of the retaining ring along the ring threads, $\varphi_{threads}$ is a value of a thread angle of the barrel threads and Y is a haft-diameter of the abutment of the retaining ring.

18. The method according to claim 16, wherein the auto-centering condition determined at step b) comprises computing radius of curvature R corresponding to:

$$R = \sqrt{\left[\frac{d_{ring}}{2\tan(\varphi_{threads}/2)} - h - T/2\right]^2 + Y^2}$$

where:
- $d_{ring}$ is a diameter of the retaining ring along the ring threads;
- $\varphi_{threads}$ is a value of the thread angle of the barrel threads;
- Y is a half-diameter of the abutment of the retaining ring;
- h is the distance between (i) a first point of contact of the barrel threads with the ring threads proximate to the optical element and (ii) a point of contact of the abutment of the retaining ring with the peripheral region of the second surface; and
- T is the distance between (i) the first point of contact of the barrel threads with the ring threads proximate to the optical element and (ii) a last point of contact of the barrel threads with the ring threads farthest from the optical element diametrically opposite to the first point of contact.

19. The method according to claim 1, wherein at least one of the thread profile for the barrel threads and the spatial profile for the peripheral region of the second surface is selected at step c) to match values therefor meeting the auto-centering condition within a predetermined centering requirement.

20. The method according to claim 1, wherein the thread profile of the barrel threads has a non-symmetrical shape and is defined by an effective thread angle.

21. The method according to claim 20, wherein the effective thread angle has a negative value with respect to a plane perpendicular to the center axis of the cavity.

22. An optical assembly comprising a barrel defining a cavity having a center axis, the optical assembly comprising one or more auto-centering optical arrangements; each of the auto-centering optical arrangements comprising:

- an optical element mounted in the cavity and having opposite first and second surfaces, the second surface comprising a peripheral region having a spatial profile;
- a seat provided in said cavity and engaging the first surface of the optical element;
- a set of barrel threads having a thread profile; and
- a retaining ring affixed to the barrel through a set of ring threads complementary to the barrel threads, the retaining ring having an abutment engaging the peripheral region of the second surface of the optical element, thereby securing the optical element between the seat and the retaining ring;

wherein, for each of said optical arrangements, the thread profile of the barrel threads and the spatial profile of the peripheral region of the second surface are selected in view of an auto-centering condition whereby any decentering of the retaining ring and a corresponding tilt of the retaining ring with respect to the center axis have counterbalancing effects on a centering of the optical element with respect to the center axis.

23. The optical assembly according to claim 22, wherein, for at least one of the auto-centering optical arrangements, the optical element is a lens, a mirror, a diffractive optical element or a pinhole.

24. The optical assembly according to claim 22, wherein, for each of the auto-centering optical arrangements, the optical element is a lens.

25. The optical assembly according to claim 22, wherein, for each of the auto-centering arrangements, each of the first and the second surface of the optical element is planar, concave or convex.

26. The optical assembly according to claim 22, wherein, for at least one of the auto-centering optical arrangements, the optical element comprises:
- a sleeve having opposite ends defining said first and second surfaces; and
- one or more optical components mounted in the sleeve and centered with respect thereto.

27. The optical assembly according to claim 26, wherein each of the optical components is a lens, a mirror or a diffractive optical element.

28. The optical assembly according to claim 26, wherein at least one of the optical components is auto-centered in the sleeve.

29. The optical assembly according to claim 22, wherein for at least one of the auto-centering optical arrangements, the thread profile of the barrel threads has a triangular shape or a trapezoidal shape.

30. The optical assembly according to claim 22, wherein for at least one of the auto-centering optical arrangements, the thread profile differs from a standard thread established by a standard setting authority.

31. The optical assembly according to claim 22, wherein for at least one of the auto-centering optical arrangements, the retaining ring is inserted within the cavity, the barrel threads being provided on an inner wall of the barrel and the ring threads being provided on an outer perimeter of the retaining ring.

32. The optical assembly according to claim 31, wherein, for at least one of the auto-centering optical arrangements, the spatial profile of the peripheral region of the second surface is defined by a radius of curvature of the second surface, said radius of curvature being predetermined according to target optical properties of the optical element, the auto-centering condition being determined in view of said radius of curvature of the second surface.

33. The optical assembly according to claim 32, wherein for said at least one of the auto-centering optical arrangements the auto-centering condition comprises a thread angle $\varphi_{threads}$ of the barrel threads corresponding to:

$$\varphi_{threads} = 2\tan^{-1}\left(\frac{d_{ring}}{2\sqrt{R^2 - Y^2}}\right)$$

where $d_{ring}$ is a diameter of the retaining ring along the ring threads, R is the value of the radius of curvature of the second surface and Y is a half-diameter of the abutment of the retaining ring.

34. The optical assembly according to claim 32, wherein the auto-centering condition determined at step b) comprises computing a thread angle $\varphi_{threads}$ of the barrel threads according to:

$$\varphi_{threads} = 2\tan^{-1}\left(\frac{d_{ring}}{2\sqrt{R^2 - Y^2} + 2h + T}\right)$$

where:
  $d_{ring}$ is a diameter of the retaining ring along the ring threads;
  R is the value of the radius of curvature of the second surface along the peripheral region thereof;
  Y is a half-diameter of the abutment of the retaining ring;
  h is the distance between (i) a first point of contact of the barrel threads with the ring threads proximate to the optical element and (ii) a point of contact of the abutment of the retaining ring with the peripheral region of the second surface; and
  T is the distance between (i) the first point of contact of the barrel threads with the ring threads proximate to the optical element and (ii) a last point of contact of the barrel threads with the ring threads farthest from the optical element diametrically opposite to the first point of contact.

35. The optical assembly according to claim 22, wherein, for at least one of the auto-centering optical arrangements, the retaining ring comprises:
  an outer annular segment provided with said ring threads, the ring threads facing inwardly to said cavity and the barrel threads facing outwardly to said cavity;
  an inner annular segment extending inside of the cavity and comprising the abutment of the retaining ring.

36. The optical assembly according to claim 22, wherein, for at least one of the auto-centering optical arrangements, the thread profile is defined by a thread angle of the barrel threads and the spatial profile is defined by a radius of curvature of the second surface along said peripheral region thereof.

37. The optical assembly according to claim 36, wherein, for the at least one of the auto-centering optical arrangements, the thread angle of the barrel threads has a value other than 55 degrees or 60 degrees.

38. The optical assembly according to claim 22, wherein, for at least one of the auto-centering optical arrangements, the thread profile of the barrel threads has a curved shape.

39. The optical assembly according to claim 22, wherein, for at least one of the auto-centering optical arrangements, the second surface of the optical element comprises a central region having a spatial profile predetermined according to target optical properties of the optical element, the spatial profile of the peripheral region of said second surface selected in view of said auto-centering condition differing from the spatial profile of the central region.

40. The optical assembly according to claim 22, wherein, for at least one of the auto-centering optical arrangements, the spatial profile of the peripheral region of the second surface is modified in view of said auto-centering condition.

41. The optical assembly according to claim 40, wherein, for said at least one of the auto-centering optical arrangements, the spatial profile of the peripheral region of the second surface is determined by a radius of curvature R corresponding to:

$$R = \sqrt{\left[\frac{d_{ring}}{2\tan(\varphi_{threads}/2)}\right]^2 + Y^2}$$

where $d_{ring}$ is a diameter of the retaining ring along the ring threads, $\varphi_{threads}$ is a value of a thread angle of the barrel threads and Y is a half-diameter of the abutment of the retaining ring.

42. The optical assembly, according to claim 40, wherein the auto-centering condition determined at step b) comprises computing radius of curvature R corresponding to:

$$R = \sqrt{\left[\frac{d_{ring}}{2\tan(\varphi_{threads}/2)} - h - T/2\right]^2 + Y^2}$$

where:
  $d_{ring}$ is a diameter of the retaining ring along the ring threads;
  $\varphi_{threads}$ is a value of the thread angle of the barrel threads;
  Y is a half-diameter of the abutment of the retaining ring;
  h is the distance between (i) a first point of contact of the barrel threads with the ring threads proximate to the optical element and (ii) a point of contact of the abutment of the retaining ring with the peripheral region of the second surface; and
  T is the distance between (i) the first point of contact of the barrel threads with the ring threads proximate to the optical element and (ii) a last point of contact of the barrel threads with the ring threads farthest from the optical element diametrically opposite to the first point of contact.

43. The optical assembly according to claim 22, comprising a plurality of said auto-centering optical arrangements cascaded within said cavity.

44. The optical assembly according to claim 22, wherein for said at least one of the auto-centering optical arrangements, the centering of the optical element with respect to the center axis has a precision of at least 5 μm.

45. The optical assembly according to claim 22, wherein for at least one of the auto-centering optical arrangements, the thread profile of the barrel threads has an non-symmetrical shape and is defined by an effective thread angle.

46. The optical assembly according to claim 45, wherein the effective thread angle has a negative value with respect to a plane perpendicular to the center axis of the cavity.

* * * * *